United States Patent

Hayatdavoudi et al.

[11] Patent Number: 6,105,691
[45] Date of Patent: Aug. 22, 2000

[54] MODULAR DRILLING FLUID SYSTEM AND METHOD

[75] Inventors: Asadollah Hayatdavoudi, San Louis Obispo; Maziar Hayatdavoudi, San Ramon, both of Calif.

[73] Assignee: Spectral, Inc., Church Point, La.

[21] Appl. No.: 09/083,051

[22] Filed: May 22, 1998

Related U.S. Application Data

[63] Continuation-in-part of application No. 08/635,354, Apr. 19, 1996.

[51] Int. Cl.$^7$ ...................................................... C09K 7/00
[52] U.S. Cl. ............................................. 175/70; 507/925
[58] Field of Search .............................. 175/65, 70, 72; 166/312; 507/106, 206, 925

[56] References Cited

U.S. PATENT DOCUMENTS

| | | | |
|---|---|---|---|
| 5,236,624 | 8/1993 | Lepert et al. | 523/353 |
| 5,330,662 | 7/1994 | Jahnke et al. | 507/244 |

*Primary Examiner*—Roger Schoeppel
*Attorney, Agent, or Firm*—Wenderoth, Lind & Ponack, L.L.P.

[57] ABSTRACT

A drilling fluid contains caustic, a natural wax, a natural thinner, glycerol, phosphoric acid and/or boric acid, and optionally a gel. The drilling fluid can be prepared in modules. Each module contains additional compounds to improve or change the action of the drilling fluid depending on the condition found in the field. The drilling fluid adjusts the properties of conventional drilling muds including increasing lubrication, thins the drilling mud, decreases bit balling, decreases rock resistance and controls phase separation of the drilling muds.

35 Claims, 3 Drawing Sheets

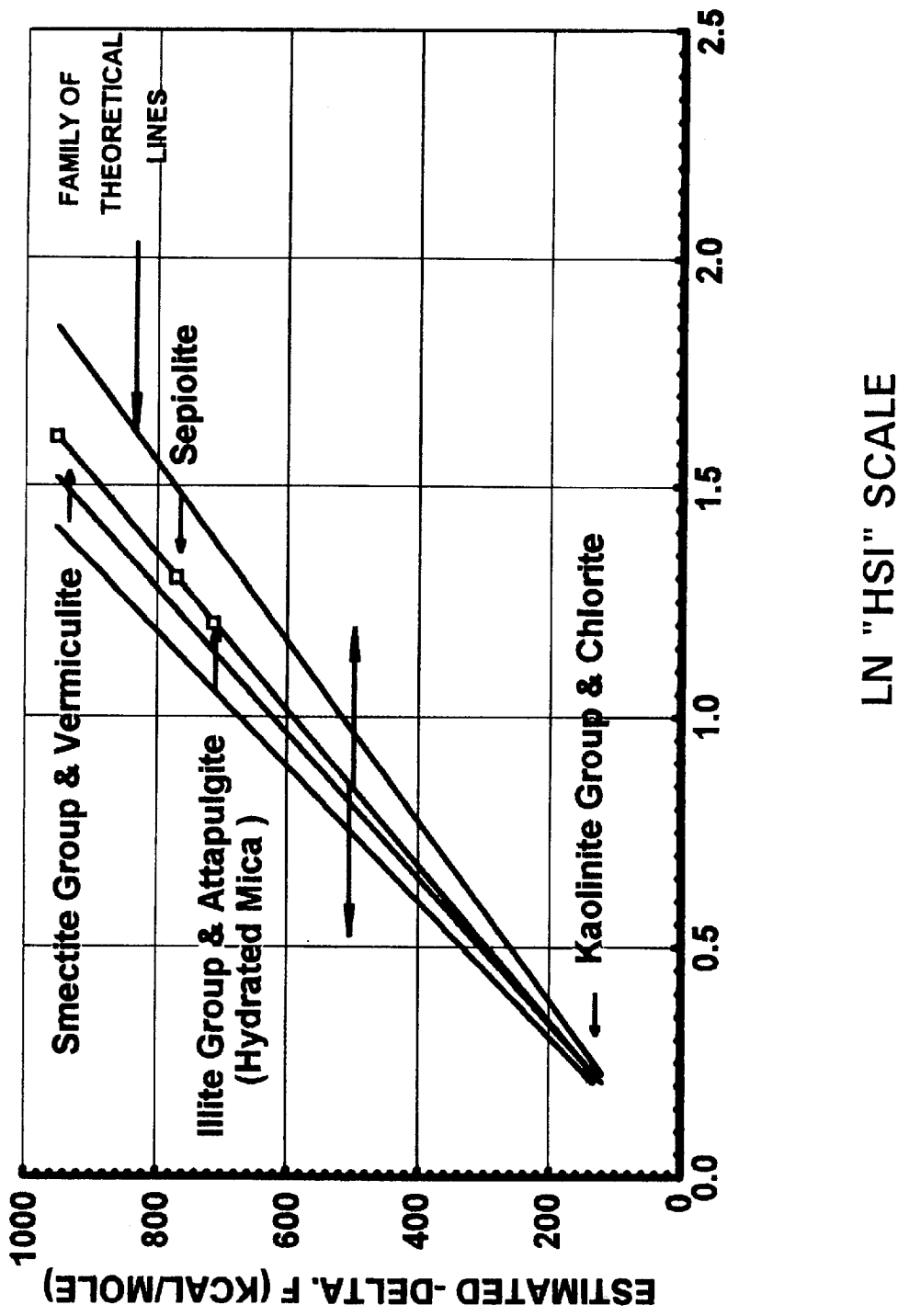

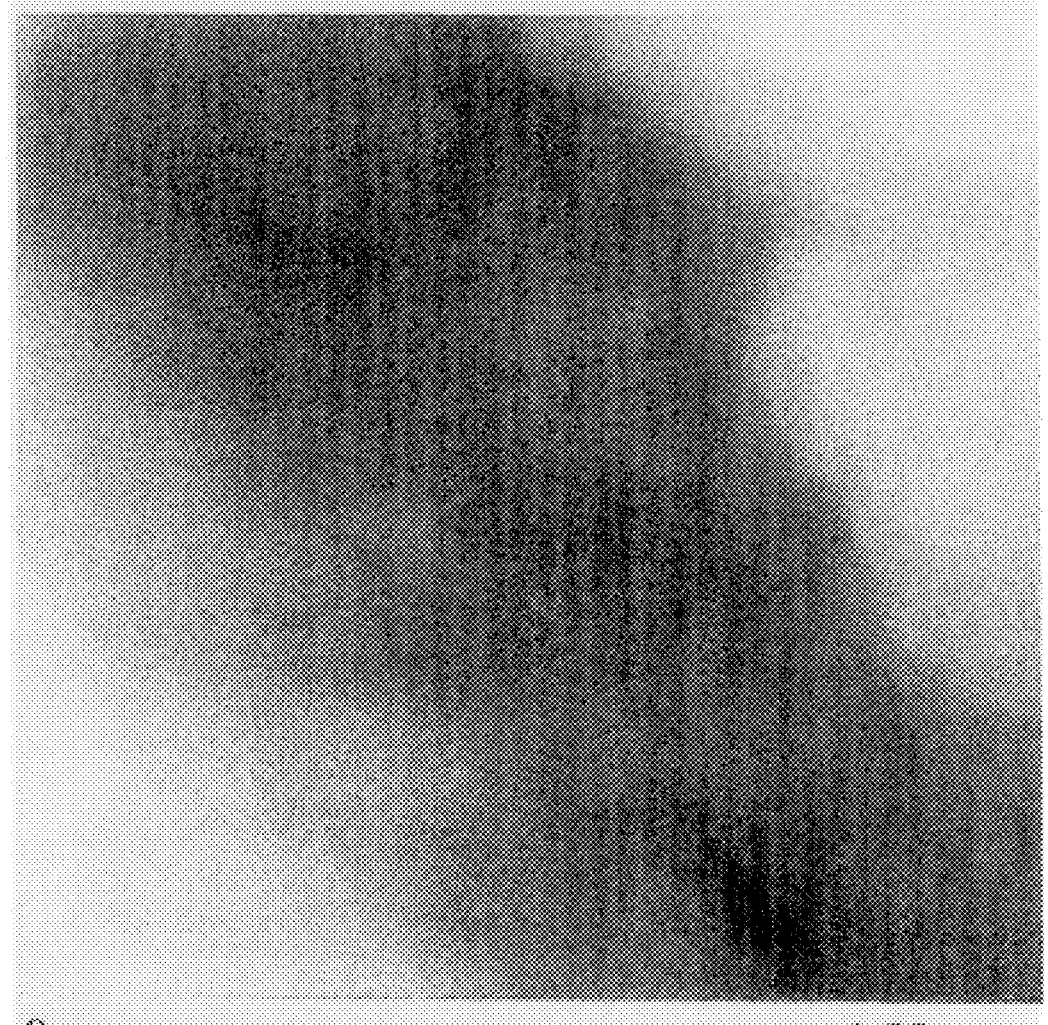

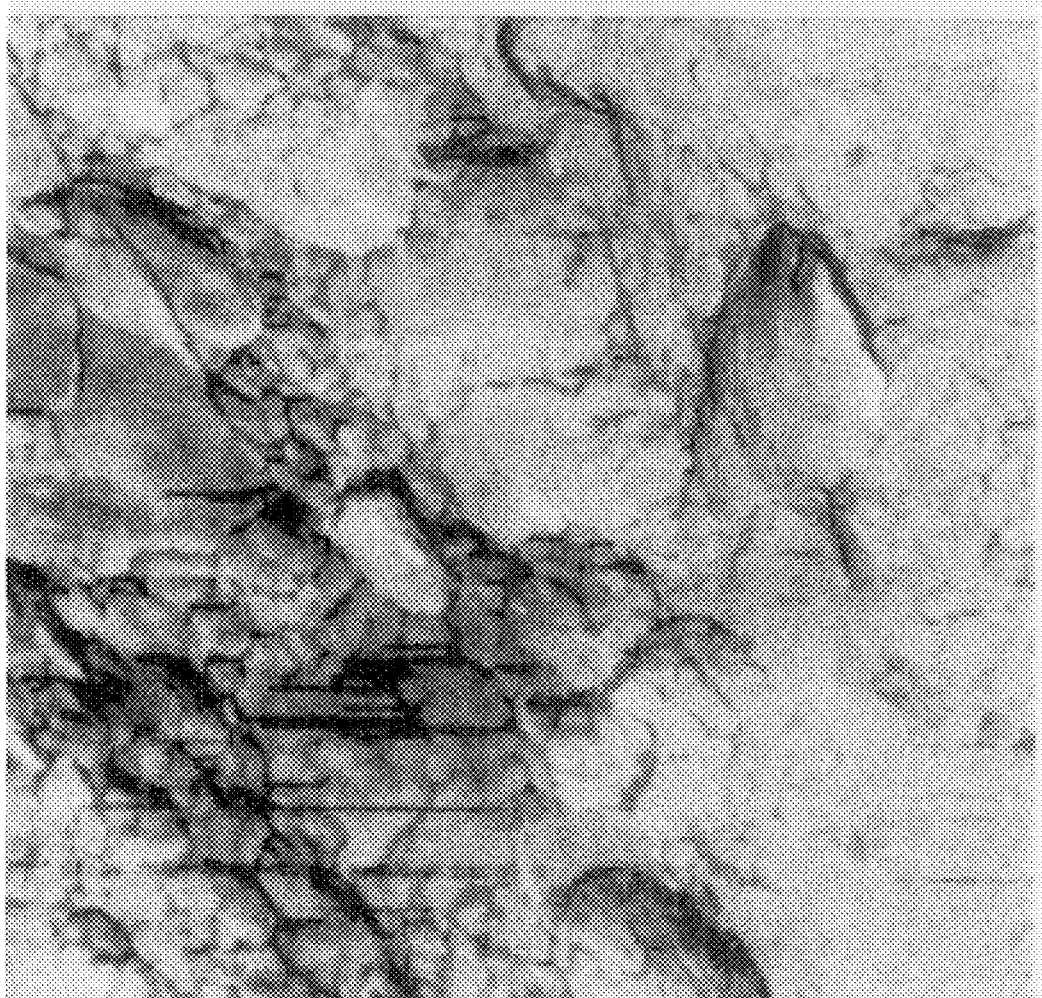

MODULAR DRILLING FLUID SYSTEM AND METHOD

RELATED APPLICATION

This application is a continuation-in-part of application Ser. No. 08/635,354, filed on Apr. 19, 1996, now allowed.

TECHNICAL FIELD

The present invention relates to drilling fluids and drilling methods, particularly those involving drilling for oil and gas.

BACKGROUND OF THE INVENTION

The drilling of earth, as in drilling for oil, typically employs a rotary drilling apparatus including a drill bit at its lower end. The rotary drilling apparatus creates a significant amount of heat due to friction during the drilling process. Therefore, a lubricant or "drilling mud" is employed to reduce heat buildup in the drilling apparatus. Also, since the earth formations encountered during drilling can vary widely, drilling muds are selected so as to condition the earth for effective removal of drill cuttings.

An exemplary drilling mud comprises a gelling agent, such as a solid phase bentonite, a weight agent, such as barite, and water. Numerous different additives to this drilling mud are also employed to control viscosity, yield point, gel strength (thixotropic properties), pH, fluid loss, tolerance to contaminants such as salt and calcium carbonate, lubricating properties, filter caking properties, cooling and heat transfer properties, and tolerance to inactive solids such as sand and silt or active native mud making clays such as smectites, illites, kaolinites, chlorites, etc. Those skilled in the art recognize that providing an acceptable drilling mud in the field requires much labor and high material handling and transportation costs. In addition, environmental and occupational safety considerations restrict the types of additives and their amounts in the drilling muds. Also, selected additives should not have fluorescence properties, so that hydrocarbon deposits can be readily identified.

Over the years, a number of drilling mud formulations have been proposed. For example, U.S. Pat. No. 3,726,850 discloses a lignin dispersing agent for dispersing clays, and the like. The lignin dispersing agent is reported to have utility in both alkaline and acidic media. A relatively low viscosity aqueous silicate solution is disclosed in U.S. Pat. No. 3,746,109, and is reported to be particularly useful in drilling through shale formations. U.S. Pat. No. 4,799,549 discloses a stable, gel-forming microemulsion comprising an aqueous solution of an alkali metal silicate, a gelling reagent, and a surface active agent (surfactant). This composition is reported to be useful for permanent or reversible plugging or clogging of subterranean formations. Also, U.S. Pat. No. 5,374,361 discloses a composition for cleaning out cased well-bores, and the like, using a fluid that includes a caustic alkyl polyglycoside surfactant formulation. This formulation is reported to be more biodegradable than previous detergent systems. A further additive encountered in aqueous drilling fluids is a metal compound, such as that described in U.S. Pat. No. 5,399,548, or a derivative of a metal compound such as a hydroxy-aluminum compound admixed with a polymer, such as disclosed in U.S. Pat. No. 4,045,357. U.S. Pat. No. 5,333,698 also discloses a drilling fluid additive in combination with a white non-toxic mineral oil. U.S. Pat. No. 4,780,220 discloses a drilling mud comprising water, a gelling agent and glycerine or polyglycerine.

Various components have been proposed as additives for drilling fluids. U.S. Pat. No. 3,215,634 suggests adding a polymer, a crosslinking agent for the polymer and a polyhydric alcohol to reduce lost circulation in oil field operations. The crosslinking agent can be a compound such as boric acid. U.S. Pat. No. 5,248,665 discloses adding a cyclic ether polyol and optionally a polyol, such as glycerol, to depress the freezing point of drilling fluids. U.S. Pat. No. 5,002,672 discloses using an aqueous composition comprising a glycerophosphoric acid ester and a diacetyltartaric acid ester of a mono or diglycerides in combination with a viscosifier, sealant and a weighting agent as a spotting fluid for releasing a stuck pipe.

Most of the additives discussed above and those employed in the industry are utilized only as additives. That is, they cannot be provided easily, safely, and economically as a "whole mud" system specifically designed to accomplish a given drilling task. Thus, a drilling fluid system is desired which can be applied in a modular fashion with one or more modules being used as needed for a particular set of requirements. Such a system should also enable a person skilled in the art to convert an old mud formulation, e.g., salt muds, lime muds, low solid muds, oil muds, etc., into such a modular system.

There is also an urgent need for improved labor health and safety in working with drilling muds, improved cleanliness of rig flooring and equipment, environmental safety and nontoxicity of additives, as well as reduced handling and storage costs.

To solve the problems of the prior art, the present inventors developed a modular drilling mud or fluid system, filed as application Ser. No. 08/635,354, filed on Apr. 19, 1996, now allowed. This modular drilling fluid system can be conveniently formulated as at least one of the following modules:

(1) an alkaline first module that contains a source of caustic, a natural wax, and a natural thinner;

(2) a second module prepared by reacting aluminum metal with the components of the alkaline first module thereby forming a soluble alkali metal aluminate;

(3) a third module containing the components of the first module in combination with at least one of an alkali metal phosphate and sodium silicate;

(4) a fourth module containing the components of the first module in combination with a $C_{1-24}$ saturated or $C_{2-24}$ unsaturated carboxylic acid source, a surfactant, and a preservative; and (5) a fifth module containing the components of the first module in combination with a $C_{1-24}$ saturated or $C_{2-24}$ unsaturated carboxylic acid source, a surfactant, a preservative, and at least one of an alkali metal phosphate and sodium silicate.

A drilling fluid represented by any of the third, fourth and fifth modules can be used for simultaneous thinning and lubricating operations. A drilling fluid represented by the second module can be used for thickening operations.

SUMMARY OF THE INVENTION

The present invention is an improvement in the above modular drilling mud or fluid system, which is accomplished by adding glycerol, phosphoric acid and/or boric acid, and optionally a gel to any one of the modules of the above modular drilling mud or fluid system.

The addition of the forgoing additives to the modular drilling mud system described above gives the following benefits:

(1) a boost in the lubricity of the modular drilling mud or fluid system, (2) a boost in the mud thinning or mud viscosity controlling power of the modular drilling mud or fluid system, (3) a decrease in the strength of the clay particle bond between the drilled clays and the drill bit, or a decrease in bit "balling" tendencies, (4) a decrease in the rock cohesive or shearing resistance immediately beneath the drill bit, or work front due to penetration of low surface tension dispersants like borates, phosphates and the like into the clay bonds and reduction in capillary entrance pressure due to low surface tension (5 to 35 dynes/cm or the present formulation, and (5) control of phase separation of the modular drilling mud or fluid system and control of the excessive loss of the mud filtrate to which the modular drilling mud or fluid system is added.

Preferably, the first module of Ser. No. 08/635,354 is composed of a "scour kier liquor"—which contains a caustic at a pH of 9 or above, as well as a natural wax and a natural thinner, such as a lignin and/or a tannin. The scour kier liquor referred to herein is typically obtained by the alkaline digestion of cellulosic fibers, e.g., cotton pulp, or lignite and is described further hereinbelow.

Preferably, the second module Ser. No. 08/635,354 is an aluminated scour kier liquor in which aluminum metal has been reacted with the scour kier liquor to produce aluminate ions in the presence of lignins and/or tannins. The aluminate ions react with the lignins and tannins, thereby crosslinking them and increasing the cutting suspension capability of the drilling mud or increase in yield point and gel strength of the drilling mud.

The third module Ser. No. 08/635,354 preferably is composed of the components of the first module in combination with at least one alkali phosphate, such as a mono-, di-, or tri- sodium, potassium, or cesium phosphate, e.g., trisodium phosphate (TSP), as well as sodium silicate, and lignite. Such a formulation produces a high pH primary thinner for poor, thick, and water thirsty mud. Optionally, the third module can contain borax.

Preferably, the fourth module Ser. No. 08/635,354 contains, in combination with the components of the first module, a saturated or unsaturated carboxylic acid rich source, such as vegetable oil or a man-made or natural triester, e.g., cottonseed oil, jojoba oil, soybean oil, palm oil, coconut oil, canola oil and the like, as well as a surfactant, which enhances the emulsification of oil and esters. Also, it is preferred that this module contains a preservative, such as a chelating agent, e.g., ethylenediamine tetraacetate (EDTA) or salt (NaCl).

The fifth module Ser. No. 08/635,354 preferably includes the components of the first, third and fourth modules identified above. More preferably, the first module is represented by kier liquor.

Also contemplated is a drilling fluid kit comprising a plurality of containers, with each of their contents defined as described hereinbelow.

Another aspect of the present invention is a drilling method employing an instant drilling fluid. Such method comprises injecting at least one of the aforementioned modules into a borehole or drill pipe, prior to or during drilling, and commencing or continuing drilling into the earth.

BRIEF DESCRIPTION OF THE DRAWINGS

FIG. 1 shows the hydration and swellability index, HSI, to determine the minimum amount of the Modular Drilling Fluid to be added to the drilling mud.

FIG. 2 shows an Atomic Force Microscope Micrograph of a clay particle in the drilling mud treated with Module 5 of the claimed invention.

DETAILED DESCRIPTION OF THE INVENTION

The present invention is for a drilling fluid system and associated method for using the system. The drilling fluid system is comprised of one or more modules of prepackaged chemical components. Each module contains flexible concentrations of its various chemical components, which permits a user to achieve a desired level of thinning, thickening, and lubricity in a drilling mud. The prepackaged modules can be employed either alone or in combination with another module to produce a drilling fluid system having the desired properties. The drilling fluid of the present invention can be used as an additive to conventional drilling muds.

The drilling fluid system of the present invention contains at least one of the following modules:

an alkaline first module that contains (a) a source of caustic, (b) a natural wax, (c) a natural thinner, (d) glycerol, and (e) phosphoric acid and/or boric acid, a second module prepared by reacting (f) aluminum metal with the components of said alkaline first module thereby forming a soluble alkali metal aluminate;

a third module containing said components of said first module in combination (g) with at least one of an alkali metal phosphate and sodium silicate;

a fourth module containing said components of said first module in combination with (h) a $C_{1-24}$ saturated or $C_{2-24}$ unsaturated carboxylic acid source, a fifth module containing said components of said first module in combination with (h) a $C_{1-24}$ saturated or $C_{2-24}$ unsaturated carboxylic acid source, and (g) at least one of an alkali metal phosphate and sodium silicate, wherein said third, fourth and fifth modules can be used for simultaneously thinning and increasing the lubricity of a drilling mud thus improving penetration of a drill bit, and said second module can be used for thickening a drilling mud.

Each of these modules is discussed separately hereinbelow.

Module 1

Module 1 is the principal drilling fluid of the instant drilling mud system. It can be used alone or in combination with one or more of the other modules as discussed hereinbelow. Module 1 is a caustic (alkaline) drilling fluid. This composition further comprises one or more natural waxes and one or more natural thinners. In addition, in accordance with the present invention, glycerol, phosphoric acid and/or boric acid, and optionally a gel are also added. The glycerol, phosphoric acid and/or boric acid is added to produce glyceroborates, e.g., glycero boriborate. Typically the pH of a Module 1 formulation is 9 or greater. Such a pH increases the spreading capability the module over the surface of clays, e.g., dispersing capability of lignosulfonates or lignites thereby facilitating the drilling operation.

A natural wax used in this composition facilitates the formation of emulsions and assists in coating solid particles released by drilling. Exemplary natural waxes which can be used in the composition are montan wax, waxes extracted from carnauba palm tree, cotton, linters, lignite deposits, and the like.

A natural thinner is also provided in Module 1, and as used herein refers to a natural colloidal clay dispersion. Exemplary natural thinners include lignins, tannins and negatively charged derivatives of humic acid.

The combination of caustic, natural wax, and natural thinner as described above is sometimes referred to herein as a "scour kier liquor", and is a principal ingredient of the instant drilling fluid system.

A preferred scour kier liquor is commercially available from Barnhardt Industries (Charlotte, N.C.). The kier liquor may also be combined with oxidizing agents such as peroxide, sodium hypochlorite, and the like.

The addition of glycerol, in accordance with the present invention, boosts the lubricity of the module. This is due to glycerol's low molecular weight and high solubility in water-based or oil based muds. Glycerol further facilitates the rapid diffusion of the modular drilling mud or fluid system in mud, porous media (e.g., rock) and clay masses adhering to the drill bit. Glycerol is added in an amount between 0.0027% by volume to 40% by volume of the module.

Phosphoric acid and/or boric acid is added to this module. Typically, the phosphoric acid and/or boric acid is added in an amount between 0.0008% and 35% by volume, assuming a 70% or higher concentration of the acid. The phosphoric acid and/or boric acid will react with the glycerol in a condensation reaction to produce a phosphate, a borate ester or combination of borophosphate esters. Due to the temperature and pressure in the bore hole, a reaction of the glycerol with phosphoric acid and/or boric acid takes place in the bore hole. This reaction product has an anionic head, comprising the phosphate or the borate which will coat, attach, or associate with the cations on the edge of the clay particles. The attraction between the anionic heads and the cations of the clay edges causes an increase in the total negative charges of the clay particles thus deflocculating or dispersing of the clay slurry or mud, clay adhering to the drill bit (so-called bit "balling" phenomenon) and the weakening of the clay "cements" holding the rock grains together.

The weakening of the clay "cements" decreases the rock resistance to the action of the drill bit through a capillary action of the filtrate of the modular drilling mud or fluid system. Once penetrating the structure of the clay "cement" through capillary pressure, the anionic heads of the phosphate, borate or combination borophosphate esters will deflocculate and weaken the cement. This is like driving a wedge between adjacent cemented particles beneath the drill bit or between the drill bit and the "balling" material.

In addition, the phosphate, borate or combination borophosphate esters will have tails that allow for solubility of the esters in the water phase of the drilling fluid. With this solubility, the filtrate of the modular drilling fluid is allowed to diffuse through capillary action into the porous media (e.g. rock).

The gel is optionally added to the modular drilling mud or fluid system to reduce phase separation and settling of the particles during storage. The gel further controls the excessive loss of the filtrate from the drilling mud to which the modular drilling fluid system is added. Typically, the gel is added in an amount of 0.001 lb to 10.0 lb per barrel.

Module 2

This module represents a mud thickener or oil solidifier in which aluminate ions have been provided. Whenever the aluminate ions are added to the drilling mud prior to pulling the drill assembly out of the hole, the gel strength of the mud increases. This means that the thixotropic properties of the drilling mud can be changed as desired, thus permitting cuttings entrained in the mud to be suspended. This module is added to a mud system also when it loses thixotropic characteristics or allows weight material to settle rapidly.

In addition, whenever any of Module 1, discussed above, and Modules 3 and 4, discussed below, are combined with oil, the addition of Module 2 causes the oil to solidify, i.e., to a rubbery or thick grease. The degree of oil solidification can be readily altered by adjusting the concentration of aluminum metal, which results in a change in the concentration of aluminate ions.

Preferably, the aluminated composition of Module 2 comprises an alkali metal aluminate in combination with the scour kier liquor described above. Any alkali metal aluminate can be used; however, a particularly preferred alkali metal aluminate is sodium, potassium, or cesium aluminate.

A preferred Module 2 formulation can be prepared by combining aluminum metal, in the form of shavings, fines, and the like, with sodium hydroxide and water in the presence of lignins or tannins. The caustic reacts with the aluminum metal to produce sodium aluminate and hydrogen gas. Some of the aluminate ions so formed react with the lignins or tannins, thereby crosslinking them. It is believed that whenever the cross-linked product is added to a clay suspension a partially reversible net charge is placed on the clay particles, which increases the gel strength of the drilling mud.

A suitable alkaline gel, or thickener, can be prepared by adding 0.2–2.0 lb of Al metal to 1 bbl of scour kier liquor.

Module 3

Module 3 of an instant drilling fluid system represents a primary thinner formulation. Functionally, this module counter-balances Module 2. In this primary thinner composition, one or both of an organic or inorganic phosphate and an organic or inorganic silicate is combined with a caustic thinning composition as in Module 1. Optionally, lignite can be combined with the other components of this module. The resulting formulation of a pH of 9 or greater super thinner that is particularly useful for poor, thick, and water thirsty muds. Considering the components of the composition, good performance at both low and high temperatures is expected.

A particularly preferred composition with a primary thinner of Module 3 comprises scour kier liquor (containing waxes and other organic materials) in combination with trisodium phosphate (TSP) and sodium silicate. Another preferred formulation includes scour kier liquor, lignite, and TSP, or a mono-, di-, or tri-sodium, potassium, or cesium phosphate, and sodium silicate. When using this composition, the waxes and other organic material (or lignite when it is used) can effectively coat colloid particles to protect them from attack by contaminants while dispersing them at the same time controllably, which produces a stable suspension condition.

A preferred formulation for module 3 can be prepared by combining with 1 bbl of scour kier liquor, each of 1–50 lb of trisodium phosphate, 0.25–2 lb sodium silicate, and 1–10 lb or borax. The borax is an optional component that is useful in some applications.

Whenever lignite and hot water are used in an amount of about 1.0 to 2.0 pounds per gallon of hot water and, for example, TSP is added, the viscosity of this newly discovered reaction product can be varied from about that of water, representing a thin fluid, to that of a solid tar or asphalt, a very thick material. This material can be used, for instance, to plug a fracture in the hole. This variation in viscosity is due to variations in the concentration of TSP in the composition.

Module 4

This module provides a secondary thinner formulation as well as a surfactant and preservative, which can be combined with any of the previous modules as needed.

Preferred components in this module are those which enhance the emulsification of oil, such as a $C_{1-24}$ saturated or $C_{2-24}$ unsaturated carboxylic acid rich source, e.g., vegetable oil or a natural ester such as cottonseed oil, jojoba oil, soybean oil, coconut oil, palm oil, canola oil and the like. This component affords a secondary thinning capability.

Optionally, a surfactant may be added to this module. The preferred surfactants include anionic or nonionic emulsifiers (surfactants) include those having a suitable HLB (hydrophilic-lipophilic balance), alkylbenzene sulfonates, tergitol, or TRITON (unavailable from Union Carbide Corp., Danbury Conn.).

The preservative present in this module helps to protect against bacteria and is preferably a chelating agent, such as salts of ethylenediamine tetraacetate (EDTA), borax or salt (NaCl). Other suitable preservatives include boric acid or derivatives thereof.

A representative formulation of this module is as follows in a water base (1 bbl): 1–10 lb borax, 0.5–10 lb borateem (which includes a sulfonated alkyl benzene—anionic surfactant), and 0.2–1 lb EDTA (Na or K salt). About 0.5–10 lb of TRITON (a nonionic surfactant) can also be optionally provided.

The carboxylic acid of module 4 will also react with the organic or inorganic acid of phosphoric acid and/or boric acid. This reaction occurs in the bore hole under the temperature and pressure of bore hole. The reaction product is a phosphate lipid, a borate lipid or a combination borophosphate lipid. Like the phosphate esters and borate esters described above, the phosphate lipid and borate lipids have anionic head which are attracted to the cations of the clay particles. Hence, these lipids have a similar function and effect as the esters described above.

Module 5

This module represents a combination of Modules 1, 3 and 4 discussed above. This composition is a super-lubricant formulation that is preferably used in treatments of 0.001 to 2.0% by volume. Using this combination of Modules 1, 3, and 4 increases the lubricity and thinning of a mud dramatically. Module 5 is the preferred embodiment of the claimed invention.

In Module 5 a polymerized phosphate ester, borate ester or borophosphate ester is formed which possesses the high lubricity properties of esters as well as the thinning capabilities of negatively charged phosphate ions and borate ions. The amount of esterification can be easily altered by adjusting the concentration of phosphate and borate.

A preferred composition for this module, is formed by combining the compositions of modules 1, 3, and 4 in the amounts detailed above with an oil base. Preferably, the oil, such as cottonseed oil, is provided in an amount up to 60% of the total volume. Optionally, up to 20%, and preferably up to 10%, of the oil content can be replaced with a mineral oil, such as FGA and/or extra glycerol.

The composition identified herein as formulation (I) is composed of scour kier liquor (SKL), TSP, borax, borateem, cottonseed oil and water in the relative amounts indicated above.

A statistical comparative analysis of all unweighted and weighted muds studied to date shows that the use of an additive as defined by Module 5 in an amount of up to 2.0% by volume gives superior results over previous products. In practice, the relative module concentrations for a given drilling fluid can be changed easily by one skilled in the art to convert an existing mud to a different mud system as desired. Factors to consider in deciding upon a desired mud system include the type of hole, i.e., vertical, slanted, deviated, directional, radial, multiradial, horizontal or radial off horizontal, the type of formation that is being drilled, drilling economics, and environmental safety, among others apparent to one skilled in the art.

Module 5 functions to coat the mud clay particle in the filter cake as shown in FIG. 1, (an Atomic Force Microscopy Micrograph). FIG. 1 shows the coating ability of Module 5. Furthermore, this coating on the particle, due to its charge and several Angstrom thickness, protects the clay particle against the adsorption of contaminant ions as well as the alleviation of cation exchanges between the clay absorbed ions and the ions found in the aqueous phase of the suspension (water). This, in fact, has enabled the use Module 5 with bentonite clays, in sea and salt water and in environments having dissolved calcium, magnesium, and iron.

Another important function of the particle coating ability of the Module 5 is to reduce the abrasion of pump rods, drilling assembly, drill bits, etc., by high viscosity mud. This particular action increases the bit life. Another very important function of the coating ability of the Module 5 is to give us a stable, lubricated and fairly gauged hole.

Module 5 further has a lower surface tension and a desirable nonfluorescence characteristic. These properties allow Module 5 to penetrate the capillaries of the formation material easily due to its low surface tension while it will not mask the desired fluorescence "show" of the oil stains on the drill cuttings. Therefore Module 5 does not have any undesired side effects.

Further, Module 5 with its high lubricity characteristics causes a reduction in friction due to the of the Module 5 (when it is added to the mud) makes the pulling (in tension) or lowering of the Logging Tools in difficult holes much easier. As a result, wells can be drilled in a reduced amount of time when Module 5 is added to the drilling mud; hence, wells can be more economically drilled. The reason for drilling these wells very economically and without trouble is that the amount of Torque and Drag inherent in drilling wells has been reduced by at least 50 percent when using 0.001 to 2.0 volume percent of Module 5 in the mud.

In addition, the effect of lubricity of Module 5 on the rubberized stator of drilling mud motor was examined. A drastic reduction in wearing of the stator in field service was discovered. The normal rubberized element life of these stator under 160° F. with the "oil mud" and "synthetic mud" is about 100 hours. The cost of premature changing of these elements offshore could climb to as high as $120,000 for each 100 hours. Therefore, Module 5 is very effective at reducing down time of a drilling rig by reducing the wear of the stator.

When the condensation reaction takes place at the surface of the clay (which is coated with anions of phosphates and borates), it produces lipids and esters at these surfaces. These esters and lipids with their negatively charged "heads" are adsorbed by the positively charged edge surfaces of the clay particles. When the reaction and the adsorption process is completed in the bore hole or in the mud tanks at a surface location, the clay particles in the suspension that are coated, deflocculated, and well treated by Module 5. The result of the repulsive forces generated between the particles in the suspension is a suspension with a thinner, lower viscosity drilling fluid. The thinner and lower viscosity suspension (mud) enhances the penetration rate of drill bit. The penetration rate of drill bit is further enhanced when there is an excess of negatively charged "heads" of the esters and lipids in the filtrate. This process, off course, depends on the concentration of phosphate and borate anions in the Module 5.

The latter process of the penetration rate enhancement mentioned above takes place in the following four steps:

The first step is that the anionically charged filtrate deflocculates and deagglomerates the "balled clays" passed onto the drill bit and drilling assemblies. This action literally frees the bit and the drilling assembly to drill ahead without much hindrance; the rate of penetration (ROP), thus, increases tremendously. The important task of removing the "ball" from the bit or drilling assembly was accomplished (at any time the bit "balled") by injecting Module 5 directly into the drill string with the mud following it. At every instance, the penetration rate increased when Module 5 reached the drill bit or as the wasted energy in the drill string was gradually converted along the drill string to a useful energy at the bit. The amount of Module 5 for the purpose of increasing penetration may be varied from 0.001 to 2.0 percent by volume of drill strings. For example, for a drill string capacity of 100 barrels at 10,000 ft, the direct injection volume of Module 5 into the drill string is (0.001/100)×(100 bbl×42 gallon/bbl)=0.042 gallons of Module 5. Accordingly, at 0.1 percent is 4.2 gallons and at 1.0 percent is 42 gallons is required per 100 bbl capacity.

The second step is that the anionically charged filtrate (with its low surface tension and high lubricity due to the formation of nonpolar but water soluble "tail" of the esters and lipids) penetrates the rock material through the capillaries. This action takes place beneath the bit, at the bit work front. The main cause of this penetrating power of the filtrate is due to the "lower" filtrate entrance pressure exerted on the pores of the rock or the "lowered" capillary pressure due to lower surface tension of the filtrate penetrating the rock pores. Consequently, the volume of the filtrate in the pore space increases rapidly which in turn increases the pore pressure of the fluid beneath the bit cutting structure. The result of the high rate of flow of the small volume of filtrate, often referred to as "spurt loss", is to "lower" the effective shear stress of the rock within a very short distance ahead of the drill bit. At this point, it should be pointed out that it is a known fact that "lowering" the effective shear stress causes the rock to loose a significant portion of its resistance to shearing action of drill bit. This favorable change in the effective shear stress undoubtedly enhances the rate of penetration of the drill bit. It should be realized that the aforementioned pore pressure build up beneath the drill bit is due to the combined capillary action, pressure differential between the bore hole mud and the formation fluid, the impact of the drill bit cutters on the formation and the fluid, and so forth. At the same time, the pressure build-up process is controlled by both diffusion of filtrate (spurt loss) in time and space beneath the bit and the diffusion coefficient. The diffusion coefficient, in turn, is controlled by the anion concentration in the filtrate, surface tension of the filtrate, rock wettability, filtrate viscosity, filtrate compressibility, rock porosity and rock permeability.

The third step is that the anionically charged filtrate (spurt loss) in contact with the clay-cemented rock will cause deagglomeration and deflocculation of the clay-cement. This is similar to driving an anionic wedge into the grains of the clay-cement and breaking it apart. The clay-cement, which holds rock grains together, like quartz grains in a shale or clay-stone, will no longer retains it original resistance to the shearing action of drill bit. At any rate, the anionic "head" wedge further weakens the rock shear resistance. Obviously, the weakened rock can be penetrated by the drill bit easier and faster. Also, the weakening of the rock chemically can only result in the expenditure of the "lesser" amount of mechanical energy per unit time to drill the same rock.

The fourth step that the addition of Module 5 to the mud, either directly by injecting it through the drill string or by adding it to the surface mud tanks, or suction pumps converts a great deal of wasted energy in the pipes, pipe annulus, and the bit jets to a useful energy. This useful energy, in turn, enhances the penetration rate.

The volume amount of Module 5 added to the drilling mud is determined by the clay "swelling" index and the clay "free energy" content. FIG. 1 graphically represents the hydration or swellability index on the x-axis, Ln "HSI" the amount of the Modular Drilling Fluid in percent by volume, which should be added to the drilling mud.

Procedure for Calculating Hydrateability or
"Swelling" Index—the "HSI"

I. Background for Theoretical Calculations and Assumptions:

a. Pauling's Acid strength theory

$$XO_m(OH)_n \tag{1}$$

or

$$H_nXO_{n+i} \tag{2}$$

wherein in Pauling's acid ionization constant theory (Rule 2):

X=any central atom of oxygen acids that ligates hydroxyl groups (OH) and oxygen (O) atom in the equations (1) and (2).

m=number of oxygen atoms in equation (1)=0, 1, 2, 3.

(m=0, meaning no excess of oxygen atom above the number of hydrogen atom, like boric acid which is a very weak acid with first ionization constant $K_1=5.8\times10^{-10}$ and m=3 for very strong acids with $K_1=10^8$).

n=number of hydroxyl group in equation (1).

i=0, 1, 2, 3 in equation (2).

II. Calculating for Drilling Muds:

The inventors have discovered that all clays are the salts of oxygen acid. In these salts silicon, aluminum and other metal and non-metal central atoms coordinate oxygen atom and hydroxyl groups in a certain way that makes them water "thirsty"; as if they "want" to ionize or dissociate in water completely but they cannot. Furthermore, the inventors have discovered that since clays contain certain amount of "free energy" which is the source of clay's "thirst" for water, they must expend this energy when they come in contact with water. Since a complete ionization or dissociation is not possible for the clays, they must expend their free energy in the form of "swelling" in water to produce a "hydrated" product; each in its own way, the free energy content of the clays in controlled, in the inventors' view, by the ratio of excess of oxygen atoms to hydroxyl groups, K=m/n. It is on this basis that the inventors have established the fundamentals of hydrateability index, HSI, and its relation to the fundamental design of the Modular Drilling Fluid System.

On the basis of above fundamentals, the aforementioned equation (1) can be repeated to convey a different meaning. Therefore:

$$XO_m(OH)_n \quad (1)$$

X=any alumino silicate, metal, and non-metal compounds in the clay.

O=oxygen content of a clay.

m=a value indicating the number of oxygen atoms present in a clay excluding those found in free water.

OH=hydroxyl ion content of a clay excluding those found in water.

n=a value indicating the number of hydroxyl groups present in a clay.

Example

Kaolinite clay:

$Al_2Si_2O_5(OH)_4$ $X=Al_2Si_2$ m=5 n=4 a. Calculating the hydrateability of "swelling" index. Here, it has been assumed that clays are salts of "oxygen".

$$K=m/n \quad (3)$$

$$HSI=LnK \quad (4)$$

where:

K=inequilibrium between oxygen and hydroxyl content that affect the hydrateability or "swelling" of a given clay. If m=n, no swelling or hydration of clay in water is possible. This is because if LnK=Ln(1)=0, therefore, there will be no source of free energy in the clay to make it "swell" or hydrate.

Example for calculating HSI

Determine HSI for kaolinite clay:

The chemical formula for kaolinite is $Al_2Si_2O_5(OH)_4$ m=5, the number of oxygen atoms in kaolinite n=4, the number of hydroxy groups in kaolinite HSI=LnK=Ln(5/4)=Ln1.25=0.223.

This is plotted on the x axis of FIG. 1 as hydrateability or "swelling" index.

b. Two methods for calculating free energy of clays:

Method A:

$$\text{Free energy, } \Delta G = \Delta F = RT \, Ln \, K \quad (5)$$

Method B:

$$\text{Free energy } \Delta G = \Delta F = \Delta H - T\Delta S \quad (6)$$

where:

R=universal gas constant=1.9872 cal/deg.mol

T=temperature (deg. Kelvin)=273+deg. "C"

ΔH=enthalpy

ΔS=entropy

In method B, we assume we known the oxide compositions of the clays and the enthalpy and entropy of each oxide at a given temperature or we can measure the enthalpy and entropy of the compound by using a simple calorimeter.

Example for Calculating the Free Energy

Determine the free energy of kaolinite clay at 25° C.;

For the sake of simplicity, we use Method A for calculating the free energy.

Using equation (5), we have:

free energy at 25° C.=ΔF=RT Ln K

ΔF=[1.9872(273+25)]Ln(5/4)=133 kcal/mol.

In FIG. 1, the value of free energy for kaolinite, 133 kcal/mol, is marked off on the y-axis. From this point, draw a horizontal line until it intersects the theoretical line; that is the line with symbols in the family of theoretical clay hydration lines. From this intersection point, draw a vertical line to the x-axis. Read the HSI=0.223 on the x-axis.

c. Relation between HSI and concentration of the Modular Drilling Fluid for treating shales.

Example

A given shale cuttings from a well bore were analyzed by X-ray diffraction technique for its clay fraction content. Data indicates the following:

(a) Kaolinite, $Si_2Al_2O_5(OH)_4$, RIR, reference intensity ratio=6%

(b) Illite, $(K, H_2O)_2Si_8(Al,Mg,Fe)_{4,6}O_{20}(OH)_4$, RIR=40%

(c) Chlorite, $(OH)_4(SiAl)_8(Mg,Fe)_6O_{20}$ (2:1 layer), $(Mg,Al)_6(OH)_{12}$(interlayer), RIR=20%.

Estimate:

1. HSI

2. The free energy content of the shale at 25° C.

3. The minimum volumetric concentration of the Modular Drilling Fluid for required for treating the water based mud in drilling the above shale safely and economically.

Solution: In our method, we exclude all free water of the clay since they do not play a significant role in oxygen-hydroxyl inequilibrium.

1. HSI (a) Kaolinite:

K=5 oxygen atoms/4 hydroxyl groups=5/4

Ln K=Ln(5/4)=0.223

(b) Illite:

K=20 oxygen/sum of hydroxy groups, $(\Sigma(OH)_2+(OH)_4)$

K=20/(2+4)=20/6=3.33

Ln K=Ln 3.33=1.203

(c) Chlorite:

$(OH)_4$ for the 2:1 layer of chlorite clay $(OH)_{12}$ for the interlayer of chlorite clay $\Sigma(OH)_4$ (for 2:1 layer)+$(OH)_{12}$ (for interlayer)=$\Sigma 4+12=16$.

K=20 oxygen/16 hydroxyl groups=20/16=1.25

Ln K=0.223

HSI=$\Sigma(Ln \, K_i)$ $(RIR)_i$; for i=1, 2, 3, to account for the number of clay types present in the shale; that is, three clays (kaolinite, illite and chlorite), and the reference intensity ration (RIR) percentages of each clay fraction (6%=0.06 kaolinite, 40%=0.4 illite, and 20%=0.2 chlorite).

$$HSI=\Sigma[(0.06)\times(0.223)+(0.4)\times(1.203)+(0.2)\times(0.223)]=0.539$$

2. Free energy available for hydration or "swelling" of the shale:

Step (1): On FIG. 1, first mark off HSI=0.539, or approximately, HSI=0.54 on the x-axis.

Step (2): Draw a vertical line from 0.54 on the x-axis to the theoretical clay hydration line; that is, the line with hollow symbols in the family of theoretical lines.

Step (3): Draw a horizontal line from the point of intersection of vertical line and theoretical line to the y-axis. Read the value ΔF=340 kcal/mol on the y-axis.

Step (4): The minimum volumetric concentration of the Modular Drilling Fluid used as a treatment of the mud is 0.5% by volume. This volumetric concentration is directly proportional to the calculated "HSI" or the HSI illustrated in FIG. 1.

Step (5): Treat the mud with the Modular Drilling Fluid according to the recommended field procedure, drill ahead safely and economically.

It is further desirable to also include a flow control agent which helps control the flow of the filtrate. Examples of flow control agent include polysodium acrylamide.

Further contemplated in the present invention is a kit containing the various modules of the invention. The kit can be conveniently prepackaged and used to address the drilling conditions encountered in the field.

The preferred method of placing the modules into the mud system is by injecting the modules directly into the bore hole of the drill string at a rate of 1–20 gal/joint of the pipe while making connections during the drilling operations In this aspect of the invention, the drilling mud kit comprises a plurality of containers, with their contents defined as follows:

(a) a first container containing a source of caustic, a natural wax, a natural thinner, glycerol, phosphoric acid and/or boric acid, and optionally a gel;

(b) a second container containing aluminum metal, or the product of reacting aluminum metal, in combination with the contents of the first container;

(c) a third container containing at least one of an alkali metal phosphate, sodium silicate, and optionally borax, in combination with the contents of the first container;

(d) a fourth container containing a $C_{1-24}$ saturated or $C_{2-24}$ unsaturated carboxylic acid source, optionally a surfactant, and optionally a preservative, as defined above, in combination with the contents of the first container; and (e) a fifth container containing a combination of the components of the first, third and fourth containers.

Of course, the compositions in the containers of the kit set forth above are described in their simplest and premixed form, and other combinations are possible. For instance, those components of the third container that are additional to the contents of the first container can be provided alone in the third container instead of being premixed with the components of the first container. Similarly, the components unique to the fourth container can be provided separate from the contents of the first container.

The invention will now be described by way of examples which illustrate the present invention but do no limit it.

EXAMPLES

Example of Changes in the Chemical Composition of Module 5 and the Absorption/Adsorption of the Same on the Mud Clay Particles and the Subsequent Field Results We conducted an API (American Petroleum Institute) standard filtration test (RP13B) under 100 psi pressure and 30 minutes of filtration. We added Module 5 in an amount between 0.5 to 2.0 percent by volume to the field mud prior to the test. The field mud was composed of the following: water, bentonite clay, caustic soda, lignite, sodium polyacrylamide. 30 pales, each 5 gallons, of Module 5 described below is added to the drilling mud.

One hundred fifty gallons of Module 5 is prepared by mixing 75 gallons cottonseed oil (with preservatives), 1 quart of glycerol, 1 quart of phoshoric acid, 4 lb. of gel, 42 gallons of water, 10 lb. of salt (NaCl), 1 quart of EDTA, 1 quart of boric acid, 10 lb. of borateem, 6 lb. of borax, 12 gallons of hot water (150° F.), 30 lb. of trisodium phosphate, 25 lb. of lignite, 1 quart of caustic soda, 25 lb. of graphite A partial composition of Module 5 after reaction with additional phosphoric acid, boric acid, glycerol, and gel before its addition to the field mud, is shown in Table 1. Table 2 shows a partial composition of what is found in the filtrate after conducting the API filter test.

TABLE 1

| Peak | RT | Area % | Library/ID | Ref # | Cas # | Goal |
|---|---|---|---|---|---|---|
| 1 | 2.88 | 2.24 | C:[D]ATABASE–BSS54K.L | 108 | 000057-13-6 | 7 |
| | | | Urea | 111 | 000107-31-3 | 4 |
| | | | Formic acid, methyl ester | 116 | 000540-73-8 | 4 |
| | | | Hydrazine, 1,2-dimethyl- | | | |
| 2 | 3.02 | 0.17 | C:[D]ATABASE–DS54K.L | 115 | 000057-14-7 | 5 |
| | | | Hydrazine, 1,1-dimethyl- | 125 | 000540-67-0 | 4 |
| | | | Ethane, methoxy- | | | |
| | | | Silane, dinethyl- | 120 | 001111-74-6 | 3 |
| 3 | 3.68 | 55.71 | C:[D]ATABASE–BS54K.L | 364 | 000640-19-7 | 4 |
| | | | Acetamide, 2-fluoro- | 879 | 000461-64-3 | 3 |
| | | | Ethyl fluoroformate | 9165 | 001763-2#-9 | 1 |
| | | | 1,5-Hexadiene, 3,3,4,4-tetrafluoro | | | |
| 4 | 4.45 | 2.36 | C:[D]ATABASE–BS54K.L | 17874 | 000086-29-3 | 5 |
| | | | Benzeneacetonitrile, .alpha.-pheny | 17860 | 005260-00-4 | 5 |
| | | | 2,2-Dimethyl-N-phenylpropanethioam | 17882 | 000948-65-2 | 5 |
| | | | 1H-Indole, 2-phenyl- | | | |
| 5 | 4.85 | 0.22 | C:[D]ATABASE–BS54K.L | 17806 | 002302-93-4 | 5 |
| | | | Hydrazinecarbothioamide, 2-(1-phen | 17818 | 001885-35-4 | 2 |
| | | | Benzonitrile, 3,4,5-trimethoxy | 17881 | 001504-16-1 | 2 |
| | | | 3-Phenylindole | | | |
| 6 | 6.07 | 0.11 | C:[D]ATABASE–BS54K.L | 364 | 000640-19-7 | 2 |
| | | | Acetamide, 2-fluoro- | 365 | 005702-11-4 | 1 |

TABLE 1-continued

| Peak | RT | Area % | Library/ID | Ref # | Cas # | Goal |
|---|---|---|---|---|---|---|
| | | | Silanamine, N-silyl | 879 | 000461-64-3 | 1 |
| | | | Ethyl fluoraformate | | | |
| 7 | 7.09 | 0.11 | C:[D]ATABASE–BS54K.L | 365 | 005702-11-4 | 3 |
| | | | Silanamine, N-silyl- | 364 | 000640-19-7 | 2 |
| | | | Acetamide, 2-fluoro- | 1860 | 000868-81-5 | 1 |
| | | | Borane, chlorodimethoxy | | | |
| 8 | 16.33 | 0.11 | C:[D]ATABASE–BS54K.L | 5458 | 003717-16-6 | 2 |
| | | | Benzaldehyde, 4-methyl-, oxime, (Z | 5415 | 000000-00-0 | 2 |
| | | | 1,2,4-DITHIAZOLE-3-THIONE | 5418 | 000000-00-0 | 2 |
| | | | METHYL N-FORMYLDITHIOCARBAMATE | | | |
| 9 | 18.16 | 0.17 | C:[D]ATABASE–BS54K.L | 364 | 000640-19-7 | 2 |
| | | | Acetamide, 2-fluoro- | 365 | 005702-11-4 | 1 |
| | | | Silanamine, N-silyl- | 3204 | 013165-70-3 | 1 |
| | | | 1-Butanamine, N-sulfinyl | | | |
| 10 | 20.05 | 0.12 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 11 | 20.30 | 0.14 | C:[D]ATABASE–BS54K.L | 5201 | 000000-00-0 | 2 |
| | | | 3-METHYL-2,1-BENZISOXAZOLE | | | |
| | | | Pyridine, 3-(2-propynyloxy)- | 5217 | 069022-70-4 | 2 |
| | | | 2H-Pyrano[3,2-b]pyridine | 5214 | 004767-91-3 | 1 |
| 12 | 21.37 | 0.12 | C:[D]ATABASE–BS54K.L | | | |
| | | | 1-Methyl-2-phenoxyethylamine | 8673 | 035205-54-0 | 3 |
| | | | METHYL N-(THIOFORMYL)DITHIOCARBAMA | 8569 | 000000-00-0 | 2 |
| | | | Acetamide, N-(3-hydroxyphenyl)- | 8622 | 000621-42-1 | 2 |
| 13 | 23.02 | 0.11 | C:[D]ATABASE–3S54K.L | 364 | 000640-19-7 | 2 |
| | | | Acetamide, 2-fluoro- | 365 | 005702-11-4 | 1 |
| | | | Silanamine, N-silyl- | 879 | 000461-64-3 | 1 |
| | | | Ethyl fluoroformate | | | |
| 14 | 23.45 | 0.15 | C:[D]ATABASE–B854K.L | 364 | 000640-19-7 | 2 |
| | | | Acetamide, 2-fluoro- | 365 | 005702-11-4 | 1 |
| | | | silanamine, N-silyl- | 3204 | 013165-70-3 | 1 |
| | | | 1-Butanamine, N-sulfinyl- | | | |
| 15 | 24.14 | 0.13 | C:[D]ATABASE–BB54K.L | 364 | 000640-19-7 | 2 |
| | | | Acetamide, 2-fluoro- | 365 | 005702-11-4 | 1 |
| | | | Silanamine, N-silyl- | 3204 | 013165-70-3 | 1 |
| | | | 1-Butanamine, N-Sulfinyl- | | | |
| 16 | 24.64 | 0.09 | C:[D]ATABASE–B854K.L | 364 | 000640-19-7 | 2 |
| | | | Acatamide, 2-fluoro- | 365 | 005702-11-4 | 1 |
| | | | Silanamine, N-silyl- | 3204 | 013165-70-3 | 1 |
| | | | 1-Butanamine, N-sulfinyl- | | | |
| 17 | 30.18 | 0.38 | C:[D]ATABASE–BS54K.L | 20854 | 084783-01-7 | 2 |
| | | | 2-Hydroxyphenyl pyrrolidinyl thion | 20879 | 039015-02-6 | 2 |
| | | | Titanium, [(1,2,3-.eta.)-2-butenyl | 20798 | 069978-07-0 | 2 |
| | | | Sydnone, 4-bromo-3-(dimethylamino) | | | |
| 18 | 34.15 | 0.13 | C:[D]ATABASE–BS54K.L | 20876 | 012636-68-9 | 2 |
| | | | Vanadium, (.eta.7-cycloheptatrieny | 20854 | 084783-01-7 | 2 |
| | | | 2-Hydroxyphenyl pyrrolidinyl thion | 20855 | 084783-02-8 | 2 |
| | | | 4-Hydroxyphenyl pyrrolidinyl thion | | | |
| 19 | 34.35 | 0.12 | C:[D]ATABASE–BS54K.L | 20855 | 084783-02-8 | 2 |
| | | | 4-Hydroxyphenyl pyrrolidinyl thion | 20676 | 012636-68-9 | 2 |
| | | | Vanadium, (.eta.7-cycloheptatrieny | 20798 | 069978-07-0 | 2 |
| | | | Sydnone, 4-bromo-3-(diaethylamino) | | | |
| 20 | 34.55 | 0.13 | C:[D]ATABASE–BS54K.L | 20855 | 084783-02-8 | 2 |
| | | | 4-Hydroxyphenyl pyrrolidinyl thion | 20876 | 012636-68-9 | 2 |
| | | | Vanadium, (.eta.7-cycloheptatrieny | 20798 | 069978-07-0 | 2 |
| | | | Sydnone, 4-bromo-3-(dimethylamino) | | | |
| 21 | 34.64 | 0.10 | C:[D]ATABASE–BBS4K.L | 20876 | 012636-68-9 | 2 |
| | | | Vanadium, (.eta.7-cycloheptatrieny | 20855 | 084783-02-8 | 2 |
| | | | 4-Hydroxyphenyl pyrrolidinyl thion | 20796 | 069976-07-0 | 2 |
| | | | Sydnone, 4-bromo-3-(dimethylamino) | | | |
| 22 | 34.80 | 0.10 | C:[D]ATABASE–B854K.L | 20855 | 084783-02-8 | 2 |
| | | | 4-Hydroxyphenyl Pyrrolidinyl thion | 20876 | 0i2636-68-9 | 2 |
| | | | Vanadium, (.eta.7-cycloheptatrieny | 5158 | 016696-87-0 | 2 |
| | | | Carbamic acid, acetylthio-, o-meth | | | |
| 23 | 34.86 | 0.18 | C:[D]ATABASE–BS54K.L | 20901 | 015236-34-7 | 5 |
| | | | Anthranilic acid, N-methyl-, butyl | 20906 | 028732-75-4 | 5 |
| | | | Pyrido[2,3-d]pyrimidine, 4-phenyl- | 20874 | 017983-71-0 | 5 |
| | | | Acetamide, N-[4-(trimethylsilyl)ph | | | |
| 24 | 34.97 | 0.20 | C:[D]ATABASE–BS54K.L | 27519 | 036653-82-4 | 9 |
| | | | 1-Hexadecanol | 52433 | 019047-55-9 | 9 |
| | | | Phosphonic acid, dioctadecyl ester | 33551 | 074685-29-3 | 9 |
| | | | 9-Eicosene, (E)- | | | |
| 25 | 35.01 | 0.27 | C:[D]ATABASE–BS54K.L | | | |
| | | | 1-Propene, 3,3,3-trifluoro- | 976 | 000677-21-4 | 4 |
| | | | 1,5-Heptadiene, (E)- | 1044 | 007736-22-3 | 4 |

TABLE 1-continued

| Peak | RT | Area % | Library/ID | Ref # | Cas # | Goal |
|---|---|---|---|---|---|---|
| | | | (E)-2-BUTENYLCYCLOPROPANE | 1015 | 000000-00-0 | 3 |
| 26 | 35.08 | 0.10 | C:[D]ATABASE–BS54K.L | | | |
| | | | 2-Propen-1-one, 1-cyclopropyl- | 1000 | 059819-62-4 | 4 |
| | | | Cycloheptene | 1051 | 000628-92-2 | 4 |
| | | | Sydnone, 4-bromo-3-(dimethylamino) | 20798 | 069978-07-0 | 4 |
| 27 | 35.16 | 0.10 | C:[D]ATABASE–BS54K.L | | | |
| | | | 1,3,5-Triazine, 2-chloro-4,6-bis(m | 20800 | 004407-40-3 | 4 |
| | | | Sydnone, 4-bromo-3-(dimethylamino) | 20798 | 069978-07-0 | 4 |
| | | | 1H-Indole, 5-methyl-2-phenyl- | 20927 | 013228-36-9 | 2 |
| 28 | 35.29 | 0.10 | C:[D]ATABASE–BS54K.L | | | |
| | | | 1,5-Pentanediamine | 1579 | 000462-94-2 | 2 |
| | | | Vanadium, (.eta.7-cycloheptatrieny | 20876 | 912636-68-9 | 2 |
| | | | 4-Hydroxyphenyl pyrrolidinyl thion | 20855 | 084783-02-8 | 2 |
| 29 | 35.42 | 0.13 | C:[D]ATABASE–BS54K.L | | | |
| | | | Anthranilic acid, N-methyl-, butyl | 20901 | 015236-34-7 | 5 |
| | | | Pyrido[2,3-d]pyrimidine, 4-phenyl- | 20906 | 028732-75-4 | 5 |
| | | | 1,3,5-Triazine, 2-chloro-4,6-bis(m | 20800 | 004407-40-3 | 4 |
| | | | C:[D]ATABASE–BS54K.L | | | |
| 30 | 35.55 | 0.10 | 1,1,1,3,5,7,7,7-OCTAMETHYLTETRASIL | 33676 | 000000-00-0 | 43 |
| | | | Gibberellic acid | 41594 | 000077-06-5 | 9 |
| | | | Pyrido[2,3-d]pyrimidine, 4-phenyl- | 20906 | 028732-75-4 | 5 |
| | | | C:[D]ATABASE–SB54K.L | | | |
| 31 | 35.60 | 0.14 | Vanadium, (.eta.7-cycloheptatrieny | 20876 | 012636-68-9 | 2 |
| | | | 4 -Hydroxyphenyl pyrrolidinyl thion | 20855 | 084783-02-8 | 2 |
| | | | Sydnone, 4-bromo-3 (dimethylamino) | 20798 | 069978-07-0 | 2 |
| 32 | 35.72 | 0.19 | C:[D]ATABASE–BS54K.L | | | |
| | | | 5,5-Dimethyl-2-(dimethylamino)-1,3 | 21256 | 015905-28-9 | 7 |
| | | | Anthranilic acid, N-methyl-, butyl | 20901 | 015236-34-7 | 5 |
| | | | 1H-Pyrrole-2,5-dione, 1-(4-chlorop | 20823 | 001631-29-4 | 5 |
| 33 | 35.75 | 0.11 | C:[D]ATABASE–BS54K.L | | | |
| | | | 1-Dotriacontanol | 49765 | 006624-79-9 | 27 |
| | | | Dodecene 6-cyclohexyl-, 6-cyclohex | 29233 | 013151-86-5 | 22 |
| | | | Octadecane, 1-(ethenyloxy)- | 35836 | 000930-02-9 | 22 |
| 34 | 35.85 | 1.65 | C:[D]ATABASE–BS54K.L | | | |
| | | | 1-Hexacosnol | 44830 | 000506-52-5 | 30 |
| | | | Ethanol, 2-(tetradecyloxy)- | 30200 | 002136-70-1 | 27 |
| | | | 1-Eicosanol | 36135 | 000629-16-9 | 27 |
| 35 | 36.04 | 0.10 | C:[D]ATABASE–BS54K.L | | | |
| | | | Anthranilic acid, N-methyl-, butyl | 20901 | 015236-34-7 | 5 |
| | | | Pyrido[2,3-d]pyrimidine, 4-phenyl- | 20906 | 028732-75-4 | 5 |
| | | | 1H-Isoindole-1,3(2H)-dione, 2-buty | 20889 | 054934-85-9 | 5 |
| 36 | 36.11 | 0.14 | C:[D]ATABASE–BS54K.L | | | |
| | | | 1,1,1,2,5,7,7,7-OCTAMETHYLTETRASIL | 33676 | 000000-00-0 | 33 |
| | | | N-(2-ACETYLCYCLOPENTYLIDENE)CYCLOH | 20907 | 000000-00-0 | 9 |
| | | | Anthranilic acid, N-methyl-, butyl | 20901 | 015236-34-7 | 5 |
| 37 | 36.17 | 0.12 | C:[D]ATABASE–BS54K.L | | | |
| | | | N-(2-ACETYLCYCOPENTYLIDENE)CYCLOH | 2090 | 000000-00-0 | 9 |
| | | | 8-Azabicyclo(3,2,1,-octane-2-carbox | 16323 | 054808-57-6 | 9 |
| | | | O-Ethyl selenohexanoate | 20989 | 062441-78-6 | 7 |
| 38 | 36.40 | 0.13 | C:[D]ATABASE–BS54K.L | | | |
| | | | Anthranilic acid, N-methyl-, butyl | 20901 | 015236-34-7 | 5 |
| | | | Andenosine, 2-methyl- | 3583 | 016526-56-0 | 5 |
| | | | 1,3,5-Triazine, 2-chloro-4,6-bis(m | 20800 | 004407-40-3 | 4 |
| 39 | 36.50 | 0.12 | C:[D]ATABASE–BS54K.L | | | |
| | | | N-(2 -ACETYLCYCOPENTYLIDINE) CYCLOH | 20907 | 000000-00-0 | 5 |
| | | | 1,3,5-Triazine, 2-chloro-4,6-bis(m | 20800 | 004407-40-3 | 4 |
| | | | Cycloheptanone, oxime | 4308 | 002158-31-5 | 4 |
| 40 | 36.54 | 0.22 | C:[D]ATABASE–BS54K.L | | | |
| | | | 1,1,1,3,5,7,7,7-OCTAMETHYLTETRASIL | 33676 | 000000-00-0 | 33 |
| | | | Anthranilic acid, N-methyl-1 butyl | 20901 | 015236-34-7 | 5 |
| | | | N-(2-ACETYLCYCLOPENTYLIDENE)CYCLO | 20907 | 000000-00-0 | 5 |
| 41 | 36.76 | 0.10 | C:[D]ATABASE–BS54K.L | | | |
| | | | Gibberellic acid | 41594 | 000077-06-5 | 36 |
| | | | 1,1,1,3,5,7,7,7-OCTAMETHYLTETRASIL | 33676 | 0000000-00-0 | 36 |
| | | | Pyrido[2,3-d]pyrimidine, 4-phenyl- | 20906 | 028732-75-4 | 5 |
| 42 | 36.85 | 0.37 | C:[D]ATABASE–BS54K.L | | | |
| | | | 1H-Indole, 5-methyl-2-phenyl- | 20927 | 013228-36-9 | 9 |
| | | | Pyrido[2,3-d]pyrimidine, 4-phenyl- | 20906 | 028732-75-4 | 5 |
| | | | Anthranilic acid, N-methyl-, butyl | 20901 | 015236-34-7 | 5 |
| 43 | 37.25 | 0.20 | C:[D]ATABASE–BS54K.L | | | |
| | | | METHYL (5-HYDROXY-1H-BENZIMIDAZOL- | 20818 | 000000-00-0 | 47 |
| | | | 1,1,1,3,5,7,7,7-OCTAMETHYLTETRASIL | 33676 | 000000-00-0 | 42 |
| | | | Acetic acid, [4-(1,1-dimethylmethyl | 23830 | 081530-52-3 | 9 |
| 44 | 37.33 | 0.17 | C:[D]ATABASE–BS54K.L | | | |
| | | | 1,1,1,3,5,7,7,7-OCTAMETHYLTETRASIL | 41594 | 000077-06-5 | 39 |
| | | | Gibberellic acid | | | |

TABLE 1-continued

| Peak | RT | Area % | Library/ID | Ref # | Cas # | Goal |
|---|---|---|---|---|---|---|
| | | | 1,1,1,2,5,5,5-Heptamethyltrisiloxa | 23675 | 001873-88-7 | 38 |
| 45 | 37.45 | 0.13 | C:[D]ATABASE–BS54K.L | 23675 | 001873-88-7 | 40 |
| | | | 1,1,1,3,5,5,5-Heptamethyltrisiloxa | | | |
| | | | 1,1,1,3,5,7,7,7-OCTAMETHYLTETRASIL | 33676 | 000000-00-0 | 36 |
| | | | Triclo[3.3.1.13,7]decanone, 4-(a | 21100 | 056782-73-1 | 9 |
| | | | Cyclobutane, 3-ethenyl-1,1,-2-trifl | | | |
| 46 | 37.56 | 0.63 | C:[D]ATABASE–BS54K.L | 23675 | 001573-88-7 | 28 |
| | | | 1,1,1,3,5,5,5-Heptamethyltrisiloxa | | | |
| | | | Tricyclo[3.3.1.13,7]decanone, 4-(a | 21100 | 056782-73-1 | 9 |
| | | | Cyclobutane, 3-ethenyl-1,1,2-.trifl | 5571 | 056196-27-1 | 9 |
| 47 | 37.65 | 0.36 | C:[D]ATABASE–BS54K.L | | | |
| | | | 1,1,1,3,5,7,7,7-OCTAMETHYLTETRASIL | 33676 | 000000-00-0 | 42 |
| | | | 1,1,1,3,5,5,5-Heptamethyltrisiloxa | 23675 | 001873-88-7 | 33 |
| | | | Acetic acid, [4-(1,1-dimethylethyl | 23830 | 088530-52-3 | 9 |
| 48 | 37.85 | 1.15 | C:[D]ATABASE–BS54K.L | | | |
| | | | 1,1,1,3,5,5,5-Heptmethyltrisiloxa | 23675 | 001873-88-7 | 42 |
| | | | 1,1,1,3,5,7,7,7-OCTAMETHYLTETRASIL | 33676 | 000000-00-0 | 36 |
| | | | 1,2-Bis(trimethylsilyl)benzene | 23815 | 017151-09-6 | 28 |
| 49 | 37.88 | 0.21 | C:[D]ATABASE–BS54K.L | | | |
| | | | 1,1,1,3,5,5,5-Heptamethyltrisiloxa | 23675 | 001873-88-7 | 40 |
| | | | 1,1,1,3,5,7,7,7-OCTAMETHYLTETRASIL | 33676 | 000000-00-0 | 28 |
| | | | 1,3-Bis(trmethylsilyl)benzene | 23815 | 017151-09-6 | 23 |
| 50 | 37.96 | 0.17 | C:[D]ATABASE–BS54K.L | | | |
| | | | 1,1,1,3,5,5,5-Heptamethyltrisiloxa | 23675 | 001873-88-7 | 38 |
| | | | 1,1,13,5,7,7,7-OCTAMETHYLTETRASIL | 33676 | 000000-00-0 | 16 |
| | | | 1,2-Bis(trimethylsilyl)benzene | 23815 | 017151-09-6 | 12 |
| 51 | 39.04 | 0.16 | C:[D]ATABASE–BS54K.L | | | |
| | | | 1,1,1,3,5,5,5-Heptamethyltrisiloxa | 23675 | 001873-88-7 | 40 |
| | | | 1,1,1,3,5,7,7,7-OCTAMETHYLTETRASIL | 33676 | 000000-00-0 | 33 |
| | | | 1,2-Bis(trmethylsilyl)benzene | 23815 | 017151-09-6 | 28 |
| 52 | 38.11 | 0.48 | C:[D]ATABASE–BS54K.L | | | |
| | | | 1,1,1,3,5,5,5-Heptamethyltrisiloxa | 23675 | 001873-88-7 | 40 |
| | | | 1,1,1,3,5,7,7,7-OCTAMETHYLTETRASIL | 33676 | 000000-00-0 | 40 |
| | | | 2-Propen-1-one, 3-[4-(1-methylethy | 28886 | 036336-80-8 | 28 |
| 53 | 38.15 | 0.65 | C:[D]ATABASE–BS54K.L | | | |
| | | | 1,1,1,3,5,5,5-Heptamethyltrisiloxa | 23675 | 001873-88-7 | 50 |
| | | | 1,1,1,3,5,7,7,7-OCTAMETHYLTETRASIL | 33676 | 000000-00-0 | 36 |
| | | | 1,2-Bis(trmethylsilyl)benzene | 23815 | 017151-09-6 | 28 |
| 54 | 38.28 | 0.33 | C:[D]ATABASE–BS54K.L | | | |
| | | | 1,1,1,3,5,5,5-Heptamethyltrisiloxa | 23675 | 001873-88-7 | 53 |
| | | | 1,1,1,3,5,7,7,7-OCTAMETHYLTETRASIL | 33676 | 000000-00-0 | 42 |
| | | | Gibberellic acid | 41594 | 000077-06-5 | 36 |
| 55 | 38.34 | 0.15 | C:[D]ATABASE–BS54K.L | | | |
| | | | 1,1,1,3,5,5,5-Heptamethyltrisiloxa | 23675 | 001873-68-7 | 40 |
| | | | 1,1,1,3,5,7,7,7-OCTAMETHYLTETRASIL | 33676 | 000000-00-0 | 30 |
| | | | 1,2-Bis(trmethylsilyl)benzene | 23815 | 017151-09-6 | 28 |
| 56 | 38.53 | 0.21 | C:[D]ATABASE–BS54K.L | | | |
| | | | 3,3-DIETHOXY-1,1,1,5,5,5-HEXAMETHY | 35651 | 000000-00-0 | 40 |
| | | | 1,2-Benzisothiazole-3-acetic acid, | 20829 | 029876-70-8 | 37 |
| | | | TRANYLCYPROMINE PENTAFLUOROBENZOYL | 39548 | 000000-00-0 | 36 |
| 57 | 38.59 | 0.48 | C:[D]ATABASE–BS54K.L | | | |
| | | | 1,1,1,3,5,5,5-Heptamethyltrisiloxa | 23675 | 001873-88-7 | 53 |
| | | | 1,1,1,3,5,7,7,7-OCTAMETHYLTETRASIL | 33676 | 000000-00-0 | 28 |
| | | | Gibberellic acid | 41594 | 000077-06-5 | 25 |
| 58 | 39.07 | 1.84 | C:[D]ATABASE–BS54K.L | | | |
| | | | 1,1,1,3,5,5,5-Heptamethyltrisiloxa | 23675 | 001873-88-7 | 53 |
| | | | Gibberellic acid | 415694 | 000077-06-5 | 53 |
| | | | 1,1,1,3,5,7,7,7-OCTAMETHYLTETRASIL | 33676 | 000000-00-0 | 36 |
| 59 | 39.17 | 0.45 | C:[D]ATABASE–BS54K.L | | | |
| | | | 1,1,1,3,5,7,7,7-OCTAMETHYLTETRASIL | 33676 | 000000-00-0 | 40 |
| | | | 1,1,1,3,5,5,5-Heptamethyltrisiloxa | 23675 | 001873-88-7 | 40 |
| | | | Gibberellic acid | 41594 | 000077-06-5 | 33 |
| 60 | 39.37 | 0.11 | C:[D]ATABASE–BS54K.L | | | |
| | | | 1,1,1,3,5,5,5-Heptamethyltrisiloxa | 23675 | 001873-88-7 | 42 |
| | | | 1,1,1,3,5,7,7,7-OCTAMETHYLTETRASIL | 33676 | 000000-00-0 | 40 |
| | | | 1,2-Bis(trmethylsilyl)benzene | 23815 | 017151-09-6 | 25 |
| 61 | 39.41 | 0.22 | C:[D]ATABASE–BS54K.L | 41594 | 000077-06-5 | 50 |
| | | | Gibberellic acid | 23675 | 001873-88-7 | 42 |
| | | | 1,1,1,3,5,5,5-Heptamethyltrisiloxa | 23830 | 088530-52-3 | 38 |
| | | | Acetic acid, [4-(1,1-dimethylethyl | | | |
| 62 | 39.87 | 2.79 | C:[D]ATABASE–BS54K.L | 23675 | 001873-88-7 | 47 |
| | | | 1,1,1,3,5,5,5-Heptamethyltrisiloxa | 33676 | 000000-00-0 | 32 |
| | | | 1,1,13,5,7,7,7-OCTAMETHYLTETRASIL | 23815 | 017151-09-6 | 25 |
| | | | 1,2,-Bis(trimethylsilyl)benzene | | | |
| 63 | 40.26 | 0.13 | C:[D]ATABASE–BS54K.L | 23675 | 001873-88-7 | 59 |
| | | | 1,1,1,3,5,5,5-Heptamethyltrisiloxa | 33676 | 000000-00-0 | 33 |
| | | | 1,1,1,3,5,7,7,7-OCTAMETHYLTETRASIL | 23815 | 017151-09-6 | 23 |

TABLE 1-continued

| Peak | RT | Area % | Library/ID | Ref # | Cas # | Goal |
|---|---|---|---|---|---|---|
| 64 | 40.77 | 1.21 | 1,2-Bis(trimethylsilyl)benzene | 33676 | 000000-00-0 | 53 |
|  |  |  | C:[D]ATABASE–BS54K.L | 23815 | 017151-09-6 | 25 |
|  |  |  | 1,1,1,3,5,7,7,7-OCTAMETHYLTETRASIL | 20906 | 028732-75-4 | 9 |
|  |  |  | 1,2-Bis(trimethylsilyl)benzene |  |  |  |
| 65 | 41.05 | 2.43 | C:[D]ATABASE–BS54K.L | 23675 | 001873-88-7 | 53 |
|  |  |  | 1,1,1,3,5,5,5-Heptamethyltrisiloxa | 33676 | 000000-00-0 | 40 |
|  |  |  | 1,1,1,3,5,7,7,7-OCTAMETHYLTETRASIL | 23815 | 017151-09-6 | 25 |
|  |  |  | 1,2-Bis(trimethylsilyl)benzene |  |  |  |
| 66 | 41.11 | 0.42 | C:[D]ATABASE–BS54K.L | 33676 | 000000-00-0 | 45 |
|  |  |  | 1,1,1,3,5,5,5-Heptamethyltrisiloxa | 23675 | 001873-88-7 | 45 |
|  |  |  | 1,1,1,3,5,7,7,7-OCTAMETHYLTETRASIL | 41594 | 000077-06-5 | 28 |
|  |  |  | Gibberellic acid |  |  |  |
| 67 | 41.16 | 0.50 | C:[D]ATABASE–BS54K.L | 23675 | 001877-88-7 | 50 |
|  |  |  | 1,1,1,3,5,5,5-Heptamethyltrisiloxa | 41594 | 000077-05-5 | 33 |
|  |  |  | Gibberellic acid | 23815 | 017151-09-6 | 23 |
|  |  |  | 1,2-Bis(trimethylsilyl)benzene |  |  |  |
| 68 | 41.30 | 0.16 | C:[D]ATABASE–BS54K.L | 23675 | 601873-88-7 | 40 |
|  |  |  | 1,1,1,3,5,5,5-Heptamethyltrisiloxa | 41594 | 000077-06-5 | 28 |
|  |  |  | Gibberellic acid | 23815 | 017151-09-6 | 25 |
|  |  |  | 1,2-Bis(trimethylsilyl)benzene |  |  |  |
| 69 | 41.36 | 0.56 | C:[D]ATABASE–BS54K.L | 23675 | 001873-88-7 | 59 |
|  |  |  | 1,1,1,3,5,5,5-Heptamethyltrisiloxa | 33676 | 000000-00-0 | 40 |
|  |  |  | 1,1,1,3,5,7,7,7-OCTAMETHYLTETRASIL | 26385 | 014629-62-0 | 23 |
|  |  |  | Silane, triethyl(2-phenylethoxy)- |  |  |  |
| 70 | 41.48 | 0.10 | C:[D]ATABASE–BS54K.L | 33676 | 000000-00-0 | 45 |
|  |  |  | 1,1,1,3,5,5,5-Heptamethyltrisiloxa | 23675 | 001873-89-7 | 42 |
|  |  |  | 1,1,1,3,5,7,7,7-OCTAMETHYLTETRASIL | 41594 | 000077-06-5 | 28 |
|  |  |  | Gibberellic acid |  |  |  |
| 71 | 42.03 | 0.93 | C:[D]ATABASE–BS54K.L | 23675 | 001873-88-7 | 53 |
|  |  |  | 1,1,1,3,5,5,5-Heptamethyltrisiloxa | 23815 | 017151-09-6 | 28 |
|  |  |  | 1,2-Bis(trimethylsilyl)benzene | 20925 | 000000-00-0 | 9 |
|  |  |  | 2-METHYL-7-PHENYLINDOLE |  |  |  |
| 72 | 42.11 | 0.32 | C:[D]ATABASE–BS54K.L | 23675 | 001873-88-7 | 59 |
|  |  |  | 1,1,1,3,5,5,5-Heptamethyltrisiloxa | 41594 | 000077-06-5 | 53 |
|  |  |  | Gibberellic acid | 33676 | 000000-00-0 | 23 |
|  |  |  | 1,1,1,3,5,7,7,7-OCTAMETHYLTETRASIL |  |  |  |
| 73 | 42.59 | 0.31 | C:[D]ATABASE–BS54K.L | 41594 | 000077-06-5 | 53 |
|  |  |  | Gibberellic acid | 20818 | 000000-00-0 | 47 |
|  |  |  | METHYL (5-HYDROXY-1H-BENZIMIDAZOL- | 23675 | 001873-86-7 | 40 |
|  |  |  | 1,1,1,3,5,5,5-Heptamethyltrisiloxa |  |  |  |
| 74 | 42.66 | 0.13 | C:[D]ATABASE–BS54K.L |  |  |  |
|  |  |  | 1,1,1,3,5,5,5-Heptamethyltrisiloxa | 23675 | 001873-88-7 | 53 |
|  |  |  | 1,1,1,3,5,7,7,7-OCTAMETHYLTETRASIL | 33676 | 000000-00-0 | 40 |
|  |  |  | Gibberellic acid | 41594 | 000077-06-5 | 36 |
| 75 | 42.10 | 0.41 | C:[D]ATABASE–BS54K.L |  |  |  |
|  |  |  | 1,1,1,3,5,5,5-Heptamethyltrisiloxa |  |  |  |
|  |  |  | Acetic acid,[4-(1,1-dimethylethyl | 23675 | 001873-88-7 | 53 |
|  |  |  | 1,1,1,3,5,7,7,7-OCTAMETHYLTETRASIL | 23830 | 088530-52-3 | 38 |
|  |  |  |  | 33676 | 000000-00-0 | 33 |
| 76 | 42.75 | 0.79 | C:[D]ATABASE–BS54K.L | 33676 | 600000-00-0 | 53 |
|  |  |  | 1,1,1,3,5,7,7,7-OCTAMETHYLTETRASIL | 23675 | 001873-88-7 | 23 |
|  |  |  | 1,1,1,3,5,5,5-Heptamethyltrisiloxa | 41594 | 000077-06-5 | 17 |
|  |  |  | Gibberellic acid |  |  |  |
| 77 | 43.21 | 0.32 | C:[D]ATABASE–BS54K.L | 33676 | 000000-00-0 | 59 |
|  |  |  | 1,1,1,3,5,7,7,7-OCTAMETHYLTETRASIL | 41594 | 000077-06-5 | 36 |
|  |  |  | Gibberellic acid | 23815 | 017151-09-6 | 25 |
|  |  |  | 1,2-Bis(trimethylsilyl)benzene |  |  |  |
| 78 | 43.23 | 0.20 | C:[D]ATABASE–BS54K.L | 33676 | 000000-00-0 | 38 |
|  |  |  | 1,1,1,3,5,7,7,7-OCTAMETHYLTETRASIL | 23815 | 017151-09-6 | 28 |
|  |  |  | 1,2-Bis(trimethylsilyl)benzene | 33583 | 016526-56-0 | 9 |
|  |  |  | Adenosine, 2-methyl- |  |  |  |
| 79 | 43.31 | 0.26 | C:[D]ATABASE–BS54K.L | 23675 | 001873-88-7 | 50 |
|  |  |  | 1,1,1,3,5,5,5-Heptamethyltrisiloxa | 41594 | 000077-06-5 | 50 |
|  |  |  | Gibberellic acid | 33676 | 000000-00-0 | 28 |
|  |  |  | 1,1,5,,3,5,7,7,7-OCTAMETHYLTETRASIL |  |  |  |
| 80 | 43.44 | 0.38 | C [D]ATABASE–BS54K.L | 23675 | 001873-88-7 | 53 |
|  |  |  | 1,1,1,3,5,5,5-Heptamethyltrisiloxa | 20818 | 000000-00-0 | 47 |
|  |  |  | METHYL (5-HYDROXY-1H-BENZIMIDAZOL- | 20829 | 029876-70-8 | 31 |
|  |  |  | 1,2-Benzisothiazole-3-acetic acid, |  |  |  |
| 81 | 43.57 | 0.89 | C:[D]ATABASE–BS54K.L | 23675 | 001873-88-7 | 45 |
|  |  |  | 1,1,1,3,5,5,5-Heptamethyltrisiloxa | 20829 | 029876-70-8 | 38 |
|  |  |  | 1,2-Benzisothiazole-3-acetic acid, | 33676 | 000000-00-0 | 33 |
|  |  |  | 1,1,1,3,5,7,7,7-OCTAMETHYLTETRASIL |  |  |  |
| 82 | 43.89 | 0.42 | C:[D]ATABASE–BS54K.L | 23675 | 001873-88-7 | 50 |
|  |  |  | 1,1,1,3,5,5,5-Heptamethyltrisiloxa | 23815 | 017151-09-6 | 37 |
|  |  |  | 1,2-Bis(trimethylsilyl)benzene- |  |  |  |

TABLE 1-continued

| Peak | RT | Area % | Library/ID | Ref # | Cas # | Goal |
|---|---|---|---|---|---|---|
| 83 | 43.96 | 2.72 | 1,2-Benzisothiazole-3-acetic acid, | 20829 | 029876-70-8 | 37 |
|  |  |  | C:[D]ATABASE–BS54K.L |  |  |  |
|  |  |  | 1,1,1,5,3,5,5,5-Heptamethyltrisiloxa | 23675 | 001873-88-7 | 42 |
|  |  |  | 1,1,1,1,3,5,7,7,7-OCTAMETHYLTETRASIL | 33676 | 000000-00-0 | 40 |
|  |  |  | Gibberellic acid | 41594 | 000077-06-5 | 33 |
| 84 | 44.83 | 0.47 | C:[D]ATABASE–BS54K.L |  |  |  |
|  |  |  | 1,1,1,3,5,5,5.Heptamethyltrisiloxa | 23675 | 001873-88-7 | 50 |
|  |  |  | 1,1,1,3,5,7,7,7-OCTAMETHYLTETRASIL | 33676 | 000000-00-0 | 50 |
|  |  |  | 2-Propen-1-one, 3-[4-(1-methylethy | 28886 | 036336-80-8 | 25 |
| 85 | 44.90 | 0.34 | C:[D]ATABASE–BS54.K.L |  |  |  |
|  |  |  | 1,1,1,3,5,5,5-Heptamethyltrisiloxa | 23675 | 001873-08-7 | 59 |
|  |  |  | 1,1,1,3,5,7,7,7-OCTAMETHYLTETRASIL | 33676 | 000000-00-0 | 42 |
|  |  |  | 1,2-Bis(trimthylsilyl)benzene | 23515 | 017151-09-6 | 25 |
| 86 | 45.09 | 0.36 | C:[D]ATABASE–BS54K.L |  |  |  |
|  |  |  | 1,1,1,3,5,5,5-Heptamethyltrisiloxa | 23675 | 001873-88-7 | 53 |
|  |  |  | Gibberellic acid | 41594 | 000077-06-5 | 50 |
|  |  |  | 1,1,1,3,5,7,7,7-OCTAMETHYLTETRASIL | 33676 | 000000-00-0 | 42 |
| 87 | 45.58 | 0.85 | C:[D]ATABASE–BS54K.L |  |  |  |
|  |  |  | 1,1,1,3,5,7,7,7-OCTANETHYLT.ETRASIL | 33676 | 000000-00-0 | 59 |
|  |  |  | 1,1,1,3,5,5,5-Heptamethyltrisiloxa | 23675 | 001873-88-7 | 53 |
|  |  |  | 1,2-Bis(trimethylsilyl)benzene | 23815 | 017151-09-6 | 25 |
| 88 | 45.79 | 0.40 | C:[D]ATABASE–BS54K.L |  |  |  |
|  |  |  | 2-Propen-1-one, 3-[4-(1-methylethy | 28886 | 036336-80-8 | 47 |
|  |  |  | 1,1,1,3,5,7,7,7-OCTAMETHYLTETRASIL | 33676 | 000000-00-0 | 42 |
|  |  |  | 1,1,1,3,5,5,5-Heptamethyltrisiloxa | 23675 | 001873-88-7 | 28 |
| 89 | 45.09 | 0.36 | C:[D]ATABASE–BS54K.L |  |  |  |
|  |  |  | 1,1,1,2,5,5,5-Heptamethyltrisiloxa | 23675 | 001873-88-7 | 50 |
|  |  |  | 1,1,1,3,5,7,7,7-OCTAMETHYLTETRASIL | 33676 | 000000-00-0 | 40 |
|  |  |  | Gibberellic acid | 41594 | 000077-06-5 | 33 |
| 90 | 45.92 | 0.13 | C:[D]ATABASE–BS54K.L |  |  |  |
|  |  |  | 1,1,1,3,5,7,7,7-OCTAMETHYLTETRASIL | 33676 | 000000-00-0 | 42 |
|  |  |  | 1,1,1,3,5,5,5-Heptamethyltrisiloxa | 23675 | 001873-85-7 | 40 |
|  |  |  | 1,2-Bis(trimethylsilyl)benzene | 23815 | 017151-09-6 | 38 |
| 91 | 46.11 | 1.12 | C:[D]ATABASE–BS54K.L |  |  |  |
|  |  |  | 1,1,1,3,5,5,5-Heptamethyltrisiloxa | 23675 | 001873-88-7 | 50 |
|  |  |  | METHYL (5-HYDROXY-1H-BENZIMIDAZOL- | 20818 | 000000-00-0 | 38 |
|  |  |  | Acetic acid, [4-(1,1-dimethylethyl | 23830 | 088530-52-3 | 25 |
| 92 | 46.33 | 0.43 | C:[D]ATABASE–BS54K.L |  |  |  |
|  |  |  | 1,1,1,3,5,5,5-Heptamethyltrisiloxa | 23675 | 001873-88-7 | 45 |
|  |  |  | 1,1,1,3,5,7,7,7-OCTAMETHYLTETRASIL | 33676 | 000000-00-0 | 37 |
|  |  |  | 2-Propen-1-one, 3-[4-(1-methylethy | 28886 | 036336-80-8 | 36 |
| 93 | 46.45 | 0.39 | C:[D]ATABASE–BS54K.L |  |  |  |
|  |  |  | 1,1,1,3,5,5,5-Heptamethyltrisiloxa | 23675 | 001873-88-7 | 50 |
|  |  |  | 1,1,1,3,5,7,7,7-OCTAMETHYLTETRASIL | 33676 | 000000-00-0 | 28 |
|  |  |  | 1,2-Bis(trimethylsilyl)benzene | 23815 | 017151-09-6 | 25 |
| 94 | 46.62 | 0.44 | C:[D]ATABASE–BS54K.L |  |  |  |
|  |  |  | 1,1,1,3,5,5,5-Heptamethyltrisiloxa | 23675 | 001873-88-7 | 53 |
|  |  |  | 1,1,1,3,5,7,7,7-OCTAMETHYLTETRASIL | 33676 | 000000-00-0 | 33 |
|  |  |  | 1,2-Bis(trimethylsilyl)benzene | 23815 | 017151-09-6 | 25 |
| 95 | 46.77 | 0.15 | C:[D]ATABASE–BS54K.L |  |  |  |
|  |  |  | 1,1,1,3,5,7,7,7-OCTAMETHYLTETRASIL | 33676 | 000000-00-0 | 50 |
|  |  |  | METHYL (5-HYDROXY-1H-BENZIMIDAZOL- | 20818 | 000000-00-0 | 43 |
|  |  |  | 1,2-Benzisothiazole-3-acetic acid, | 20829 | 029876-70-8 | 37 |
| 96 | 46.83 | 0.14 | C:[D]ATABASE–BS54K.L |  |  |  |
|  |  |  | 1,1,1,3,5,7,7,7-OCTAMETHYLTETRASIL | 33676 | 000000-00-0 | 59 |
|  |  |  | 1,1,1,3,5,5,5-Heptamethyltrisiloxa | 23675 | 001873-88-7 | 50 |
|  |  |  | 1,2-Benzisothiazole-3-acetic acid, | 20829 | 029876-70-8 | 37 |
| 97 | 46.98 | 0.10 | C:[D]ATABASE–BS54K.L |  |  |  |
|  |  |  | Gibberellic acid | 41594 | 000077-06-5 | 50 |
|  |  |  | 1,1,1,3,5,5,5-Heptamethyltrisiloxa | 23675 | 001873-98-7 | 42 |
|  |  |  | 1,1,1,3,5,7,7,7-OCTAMETHYLTETRASIL | 33676 | 000000-00-0 | 33 |
| 98 | 47.00 | 0.23 | C:[D]ATABASE–BS54K.L | 33676 | 001873-88-7 | 53 |
|  |  |  | 1,1,1,3,5,5,5-Heptamethyltrisiloxa |  |  |  |
|  |  |  | Gibberellic acid | 41594 | 000077-06-5 | 53 |
|  |  |  | 1,1,1,3,5,7,7,7-OCTAMETHYLTETRASIL | 33676 | 000000-00-0 | 40 |
| 99 | 47.07 | 1.01 | C:[D]ATABASE–BS54K.L |  |  |  |
|  |  |  | 1,1,1,3,5,7,7,7-OCTAMETHYLTETRASIL | 33676 | 000000-00-0 | 59 |
|  |  |  | 1,1,1,3,5,5,5-Heptamethyltrisiloxa | 23675 | 001873-98-7 | 50 |
|  |  |  | Gibberellic acid | 41594 | 000077-06-5 | 28 |
| 100 | 47.33 | 0.96 | C:[D]ATABASE–BS54K.L |  |  |  |
|  |  |  | 1,1,1,3,5,5,5-Heptamethyltrisiloxa | 23675 | 001873-88-7 | 33 |
|  |  |  | Gibberellic acid | 41594 | 000077-06-5 | 28 |
|  |  |  | 1,2-Bis(trimethylsilyl)benzene | 23815 | 017151-09-6 | 23 |

TABLE 2

| Peak | RT | Area % | Library/ID | Ref # | Cas # | Goal |
|---|---|---|---|---|---|---|
| 1 | 2.76 | 0.58 | C:[D]ATABASE–BS54K.L | 116 | 000540-73-8 | 2 |
| | | | Hydrazine, 1,2-diaethyl- | 108 | 000057-13-6 | 2 |
| | | | Urea | | | |
| | | | Hydrazine, ethyl- | 118 | 000624-80-6 | 2 |
| 2 | 2.96 | 54.71 | C:[D]ATABASE–BS54K.L | 364 | 000640-19-7 | 4 |
| | | | Acetamide, 2-flouro- | 879 | 000461-64-3 | 3 |
| | | | Ethyl fluoroformate | | | |
| | | | 1-Triazene, 3,3-dimethyl-1-phenyl- | 8192 | 007227-91-0 | 2 |
| 3 | 4.42 | 1.96 | C:[D]ATABASE–BS54K.L | 17873 | 000613-13-8 | 9 |
| | | | 2-Anthracenamine | | | |
| | | | Benzeneacetonitrile, .alpha.-pheny | 17874 | 000086-29-3 | 5 |
| | | | 2H-Azirine, 2,3-diphenyl- | 17880 | 016483-98-0 | 5 |
| 4 | 4.64 | 0.11 | C:[D]ATABASE–BS54K.L | | | |
| | | | 2-DIMETHYLAMINO-2'-METHOXYACETOPHE | 17825 | 000000-00-0 | 3 |
| | | | 2-Dimethylamino-4'-Methoxyacetophe | 17829 | 053250-07-0 | 3 |
| | | | Hydrozinecarbothioamide, 2-(1-phen | 17806 | 002302-93-4 | 2 |
| 5 | 5.23 | 0.25 | C:[D]ATABASE–BS54K.L | 364 | 000640-29-7 | 2 |
| | | | Acetamide, 2-fluoro- | 365 | 005702-11-4 | 1 |
| | | | Silanamine, K-silyl- | 3204 | 013165-70-3 | 1 |
| | | | i-Butanamine, N-sulfinyl- | | | |
| 6 | 5.44 | 0.15 | C:[D]ATABASE–BS54K.L | 209 | 000123-73-9 | 2 |
| | | | 2-Butenal, (E)- | 205 | 000078-65-3 | 2 |
| | | | 2-Propenal, 2-methyl- | 214 | 015798-64-8 | 2 |
| | | | 2-Butenal, (2)- | | | |
| 7 | 5.49 | 0.16 | C:[D]ATABASE–BS54K.L | | | |
| | | | Cyclopropane, 1,2-dimethyl-, trans | 221 | 002402-06-4 | 4 |
| | | | Cyclopropane, 1,1-dimethyl- | 230 | 001630-94-0 | 4 |
| | | | Methane, isocyanato- | 83 | 000624-83-9 | 4 |
| 8 | 5.58 | 0.16 | C:[D]ATABASE–BS54K.L | 364 | 000640-19-7 | 2 |
| | | | Acetamide, 2-fluoro- | 87 | 001072-44-2 | 1 |
| | | | Aziridine, 1-Methyl- | 84 | 000503-29-7 | 1 |
| | | | Azetidine | | | |
| 9 | 5.72 | 0.11 | C:[D]ATABASE–BS54K.L | 364 | 000640-19-7 | 2 |
| | | | Acetamide, 2-fluoro- | 87 | 001072-44-2 | 1 |
| | | | Aziridine, 1-methyl- | 84 | 000503-29-7 | 1 |
| | | | Azetidine | | | |
| 10 | 16.95 | 0.15 | C:[D]ATABABE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 11 | 17.15 | 0.13 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 12 | 17.42 | 0.15 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 13 | 17.57 | 0.11 | C:[D]ATABASE–BS54K.L | | | |
| | | | Acetamide, 2-fluoro- | 364 | 000640-19-7 | 2 |
| | | | Siianamine, N-siyll | 365 | 005702-11-4 | 1 |
| | | | 1-Butanamine, N-sulfinyl- | 3204 | 013165-70-3 | 1 |
| 14 | 17.76 | 0.15 | C:[D]ATABASE–BS54K.L | | | |
| | | | Acetamide, 2-fluoro | 364 | 000640-19-7 | 2 |
| | | | silanamine, N-silyl- | 365 | 005702-11-4 | 1 |
| | | | 1-Butanamine, N-sulfinyl- | 3204 | 013165-70-3 | 1 |
| 15 | 17.94 | 0.12 | C:[D]ATABASE–BS54K.L | | | |
| | | | Acetamide, 2-fluoro- | 364 | 000640-19-7 | 2 |
| | | | Silanamine, N-allyl- | 365 | 005702-11-4 | 1 |
| | | | 1-Butanamine, N-Sulfinyl- | 3204 | 013165-70-3 | 1 |
| 16 | 18.00 | 0.15 | C:[D]ATABASE–BS54K.L | | | |
| | | | Acetamide, 2-fluoro- | 364 | 000640-19-7 | 2 |
| | | | Silanamide, N-silyl | 365 | 005702-11-4 | 1 |
| | | | 1-Butanamine, N-Silfinyl- | 3204 | 013165-70-3 | 1 |
| 17 | 18.13 | 0.18 | C:[D]ATABASE–BS54K.L | 364 | 000640-19-7 | 2 |
| | | | Acetamide, 2-fluoro- | | | |
| | | | Silanamine, N-silyl- | 365 | 005702-11-4 | 1 |
| | | | 1-Butanamine, N-sulfinyl- | 3204 | 013165-70-3 | 1 |
| 18 | 18.42 | 0.16 | C:[D]ATABASE–BS54K.L | 364 | 000640-19-7 | 2 |
| | | | Acetamide,2-fluoro- | 365 | 005702-11-4 | 1 |
| | | | Silanamine, N-silyl- | | | |
| | | | 1-Butanamine, N-Sulfinyl- | 3204 | 013165-70-3 | 1 |
| 19 | 18.51 | 0.29 | C:[D]ATABASE–BSS4K.L | 364 | 000640-19-7 | 2 |
| | | | Acetamide, 2-fluoro- | | | |
| | | | Silanamine, N-silyl- | 365 | 005702-11-4 | 1 |
| | | | 1-Butanamine, N-Sulfinyl- | 3204 | 013165-70-3 | 1 |
| 20 | 18.65 | 0.22 | C:[D]ATABASE–BS54K.L | 364 | 000640-19-7 | 2 |

TABLE 2-continued

| Peak | RT | Area % | Library/ID | Ref # | Cas # | Goal |
|---|---|---|---|---|---|---|
| | | | Acetamide, 2-flouro- | | | |
| | | | Silanamine, N-silyl- | 365 | 005702-11-4 | 1 |
| | | | 1-Butanamine, N-sulfinyl- | 3204 | 013165-70-3 | 1 |
| 21 | 18.72 | 0.14 | C:[D]ATABASE–BB54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 22 | 18.77 | 0.28 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 23 | 18.87 | 0.12 | C:[D]ATABASE–BS54K.L | | | |
| | | | Acetamide, 2-fluoro- | 364 | 000640-19-7 | 2 |
| | | | silanamine, N-silyl- | 365 | 005702-11-4 | 1 |
| | | | 1-Butanamide, N-sulfinyl- | 3204 | 013165-70-3 | 1 |
| 24 | 18.93 | 0.17 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 25 | 18.98 | 0.13 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 26 | 19.08 | 0.28 | C:[D]ATABASE–BSS4K.L | | | |
| | | | Acetamide, 2-fluoro- | 364 | 000640-19-7 | 2 |
| | | | Silanamine; N-silyl- | 365 | 005702-11-4 | 1 |
| | | | 1-Butanamine, N-sulfinyl- | 3204 | 013165-70-3 | 1 |
| 27 | 19.14 | 0.13 | C:[D]ATABASE–BS54K.L | 364 | 000640-19-7 | 2 |
| | | | Acetamide, 2-fluoro- | | | |
| | | | Silanamine, N-silyl- | 365 | 005702-11-4 | 1 |
| | | | t-Butanamne, N-sulfinyl- | 3204 | 013165-70-3 | 1 |
| 22 | 19.19 | 0.21 | C:[D]ATABASE–BS54K.L | 364 | 000640-19-7 | 2 |
| | | | Acetamide, 2-fluoro- | | | |
| | | | Silanamine, N-silyl- | 365 | 005702-11-4 | 1 |
| | | | 1-Bulanamine, N-sulfinyl- | 3204 | 013165-70-3 | 1 |
| 29 | 19.32 | 0.20 | C:[D]ATABASE–BS54K.L | 364 | 000640-19-7 | 2 |
| | | | Acetamide, 2-fluoro- | | | |
| | | | Silanamine, N-silyl- | 365 | 005702-11-4 | 1 |
| | | | 1-Bulanamine, N-sulfinyl- | 3204 | 013165-70-3 | 1 |
| 30 | 19.40 | 0.18 | C:[D]ATABASE–BS54K.L | 364 | 000640-19-7 | 2 |
| | | | Acetamide, 2-fluoro- | | | |
| | | | Silanamine, N-silyl- | 365 | 005702-11-4 | 1 |
| | | | 1-Butanamine, N-sulfinyl- | 3204 | 013165-70-3 | 1 |
| 31 | 19.74 | 0.18 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | t-Butanamine, N-sulfinyl- | 3204 | 013165-70-3 | 1 |
| 32 | 19.90 | 0.34 | C:[D]ATABASE–B54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-Sulfinyl- | 3204 | 013165-70-3 | 1 |
| 33 | 20.01 | 0.27 | C:[D]ATABASE–BS54K.L | | | |
| | | | Acetamide, 2-flulro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 34 | 20.27 | 0.35 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 35 | 20.38 | 0.56 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | t-Butanamine, N-sulfinyl- | 3204 | 013165-70-3 | 1 |
| 36 | 20.63 | 0.31 | C:[D]ATABASE–BS54K.L | | | |
| | | | Acetamide, 3-fluoro- | 364 | 000640-19-7 | 2 |
| | | | Silanamide, N-silyl | 365 | 005702-11-4 | 1 |
| | | | 1-Butanamine, N-sulfinyl- | 3204 | 013165-70-3 | 1 |
| 37 | 20.75 | 0.20 | C:[D]ATABASE–BS54K.L | | | |
| | | | Acetamide, 2-fluoro- | 364 | 000646-19-72 | |
| | | | Silanamine, N-silyl- | 365 | 005702-11-4 | 1 |
| | | | 1-Butanamine, N-sulfinyl- | 3204 | 013165-70-3 | 1 |
| 38 | 20.86 | 0.37 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 39 | 20.99 | 0.15 | C:[D]ATABASE–BS54K.L | | | |

TABLE 2-continued

| Peak | RT | Area % | Library/ID | Ref # | Cas # | Goal |
|---|---|---|---|---|---|---|
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 40 | 21.12 | 0.13 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 41 | 21.17 | 0.14 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 42 | 21.23 | 0.12 | C:[D]ATABASE–BS54K.L | | | |
| | | | Acetamide, 2-fluoro- | 364 | 000640-19-7 | 2 |
| | | | silanamine, N-allyl- | 365 | 005702-11-4 | 1 |
| | | | 1-Butanamine, N-sulfinyl- | 3204 | 013165-70-3 | 1 |
| 43 | 21.43 | 0.20 | C:[D]ATABASE–BS54K.L | | | |
| | | | Acetamide, 2-fluoro- | 364 | 000640-19-7 | 2 |
| | | | Silanamine, N-allyl- | 365 | 005702-11-4 | 1 |
| | | | 1-Butanamine, N-sulfinyl- | 3204 | 013165-70-3 | 1 |
| 44 | 21.51 | 0.17 | C:[D]ATABASE–B554K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 45 | 21.53 | 0.25 | C:[D]ATABASE–BS54K.L | | | |
| | | | Acetamide, 2-fluoro- | 364 | 000640-19-7 | 2 |
| | | | Silanamine, N-allyl- | 365 | 005703-11-4 | 1 |
| | | | 1-Butanamine, N-sulfinyl- | 3204 | 013165-70-3 | 1 |
| 46 | 21.72 | 0.23 | C:[D]ATABASE–BS54K.L | | | |
| | | | 3-METHYL-2,1-BENZISOXAZOLE | 5201 | 000000-00-0 | 2 |
| | | | Pyridine, 3-(2-propynyloxy)- | 5217 | 069022-70-4 | 2 |
| | | | 2H-Pyrano[3,2-b]pyridine | 5214 | 004767-91-3 | 1 |
| 47 | 21.85 | 0.23 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | i-Butanamine, N-sulfinyl- | 3204 | 013165-70-3 | 1 |
| 48 | 22.03 | 0.16 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 49 | 22.12 | 0.34 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 50 | 22.2 | 0.11 | C:[D]ATABASE–BS54K.L | | | |
| | | | Acetamide, 2-fluoro-. | 364 | 000640-19-7 | 2 |
| | | | Silanamine, N-silyl- | 365 | 005702-11-4 | 1 |
| | | | 1-Butanamine, Sulfinyl- | 3204 | 013165-70-3 | 1 |
| 51 | 22.31 | 0.13 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 52 | 22.45 | 0.50 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 53 | 22.54 | 0.15 | C:[D]ATABASE–BS54K.L | | | |
| | | | Acetamide, 2-fiuoro- | 364 | 000640-19-7 | 2 |
| | | | Silanamine, N-silyl- | 365 | 005702-11-4 | 1 |
| | | | 1-Butanamine, N-sulfinyl-. | 3204 | 013165-70-3 | 1 |
| 54 | 22.64 | 0.15 | C:[D]ATAAASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 55 | 22.72 | 0.24 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 56 | 22.75 | 0.13 | C;[D]ATABASE-BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 57 | 22.99 | 0.27 | C:[D]ATABASE-BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 58 | 23.22 | 0.18 | C:[D]ATABASE-BS54K.L | | | |
| | | | Acetamide, 2-fluoro- | 364 | 000640-19-7 | 2 |
| | | | | 365 | 005702-11-4 | 1 |

TABLE 2-continued

| Peak | RT | Area % | Library/ID | Ref # | Cas # | Goal |
|---|---|---|---|---|---|---|
| | | | Silanamine, N-silyl- | 3204 | 013165-70-3 | 1 |
| | | | 1-Butanamine, N-sulfinyl- | | | |
| 59 | 23.37 | 0.18 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 60 | 23.47 | 0.20 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 61 | 23.50 | 0.26 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 62 | 23.60 | 0.24 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 63 | 23.88 | 0.30 | c:[D]ATABASE–BS54K.L | | | |
| | | | 3-METHYL-2,1-BENZISOXAZOLE | 5201 | 000000-60-0 | 2 |
| | | | Pyridine, 3-(2-propynyloxy)- | 5217 | 069022-70-4 | 2 |
| | | | 2H-Pyrano[3,2-b]pyridine | 5214 | 004767-91-3 | 1 |
| 64 | 24.12 | 0.22 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 65 | 24.31 | 0.30 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 66 | 24.57 | 0.17 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3- | 1 |
| 67 | 24.67 | 0.22 | C:[D]ATABASE–BS54K.L | | | |
| | | | Pyridine, 3-(2-propynyloxy)- | 5217 | 069022-70-4 | 2 |
| | | | 2H-Pyrano[3,2-b]pyridine | 5214 | 004767-91-3 | 1 |
| | | | tert-Butyl N-hydroxycarbamate | 5183 | 036016-38-3 | 1 |
| 68 | 24.94 | 0.13 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 69 | 25.01 | 0.16 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 70 | 25.15 | 0.11 | C:[D]ATABASE–BS54K.L | | | |
| | | | Acetamide, 2-fluoro- | 364 | 000640-19-7 | 2 |
| | | | Silanamine, N-silyl- | 365 | 005702-11-4 | 1 |
| | | | 1-Butanamine, N-sulfinyl- | 3204 | 013165-70-3 | 1 |
| 71 | 25.38 | 0.10 | C:[D]ATABASE–BS54K.L | | | |
| | | | 3-METHYL-2,1-BENZISOXAZOLE | 5201 | 000000-00-0 | 2 |
| | | | Pyridine, 3-(2-propynyloxy)- | 5217 | 069022-70-4 | 2 |
| | | | 2H-Pyrano[3,2-b]pyridine | 5214 | 004767-90-3 | 1 |
| 72 | 30.20 | 0.22 | C:[D]ATABASE–BS54K.L | | | |
| | | | 2-Hydroxyphenyl pyrrolidinylthion | 20854 | 084783-01-7 | 2 |
| | | | Sydnone, 4-bromo-3-(dimethylamino) | 20798 | 069978-07-0 | 2 |
| | | | 4-Hydroxyphenyl pyrrolidinyl thion | 20855 | 084783-02-8 | 2 |
| 73 | 30.77 | 0.19 | C:[D]ATABASE–BS54K.L | | | |
| | | | 2-Hydroxyphenyl pyrrolidinyl thion | 20854 | 084783-01-7 | 2 |
| | | | 4-Hydroxyphenyl pyrrolidinyl thion | 20855 | 084783-02-8 | 2 |
| | | | Titanium, [(1,2,3-.eta.)-2-butenyl | 20879 | 039015-02-6 | 2 |
| 74 | 31.17 | 0.15 | C:[D]ATABASE–BS54K.L | | | |
| | | | 2-Hydroxyphenyl pyrrolidinyl thion | 20879 | 039015-02-6 | 2 |
| | | | 4-Hydroxyphenyl pyrrolidinyl thion | 20854 | 084783-01-7 | 2 |
| | | | Titanium, [(1,2,3-.eta.)-2-butenyl | 20855 | 084783-02-8 | 2 |
| 75 | 31.67 | 0.29 | C:[D]ATABASE–BS54K.L | | | |
| | | | 2-Hydroxyphenyl pyrrolidinyl thion | 20854 | 084783-01-7 | 2 |
| | | | 4-Hydroxyphenyl pyrrolidinyl thion | 20855 | 084783-02-8 | 2 |
| | | | Titanium, [(1,2,3-.eta.)-2-butenyl | 20879 | 039015-02-6 | 2 |
| 76 | 31.76 | 0.22 | C:[D]ATABASE–BS54K.L | 20854 | 084783-01-7 | 2 |
| | | | 2-Hydroxyphenyl pyrrolidinyl thion | | | |
| | | | 4-Hydroxyphenyl pyrrolidinyl thion | 20855 | 084783-02-8 | 2 |
| | | | Titanium, [(1,2,3-.eta.)-2-butenyl | 20879 | 039015-02-6 | 2 |
| 77 | 31.96 | 0.16 | C:[D]ATABASE–BS54K.L | | | |
| | | | 2-Hydroxyphenyl pyrrolidinyl thion | 20854 | 084783-01-7 | 2 |
| | | | 4-Hydroxyphenyl pyrrolidinyl thion | 20855 | 084783-02-8 | 2 |

TABLE 2-continued

| Peak | RT | Area % | Library/ID | Ref # | Cas # | Goal |
|---|---|---|---|---|---|---|
| | | | Titanium, [(1,2,3-.eta.)-2-butenyl | 20879 | 039015-02-6 | 2 |
| 78 | 32.59 | 0.12 | C:[D]ATABASE–BS54K.L | | | |
| | | | 2-Hydroxyphenyl pyrrolidinyl thion | 20854 | 084783-01-7 | 2 |
| | | | 4-Hydroxyphenyl pyrrolidinyl thion | 20855 | 084783-02-8 | 2 |
| | | | Titanium, [(1,2,3-.eta.)-2-butenyl | 20879 | 039015-02-6 | 2 |
| 79 | 34.04 | 0.12 | C:[D]ATABASE–BS54K.L | | | |
| | | | 4-Hydroxyphenyl pyrrolidinyl thion | 20855 | 084783-02-8 | 2 |
| | | | 2-Hydroxyphenyl pyrrolidinyl thion | 20854 | 084783-01-7 | 2 |
| | | | Vanadium, (.eta.7-cycloheptatrieny | 20876 | 012636-68-9 | 2 |
| 80 | 34.25 | 0.15 | C:[D]ATABASE–BS54K.L | | | |
| | | | Vanadium, (.eta.7-cycloheptatrieny. | 20876 | 012636-68-9 | 2 |
| | | | 2-Hydroxyphenyl pyrrolidinyl thion | 20854 | 084783-01-7 | 2 |
| | | | 4-Hydroxyphenyl pyrrolidinyl thion | 20855 | 084783-02-8 | 2 |
| 81 | 34.43 | 0.11 | C:[D]ATABASE–BS54K.L | 20855 | 084783-02-8 | 2 |
| | | | 4-Hydroxyphenyl pyrrolidinyl thion | 20876 | 012636-68-9 | 2 |
| | | | Vanadium, (.eta.7-cycloheptatrieny | 5158 | 016696-87-0 | 2 |
| | | | Carbamic acid, acetylthio-, O-meth | | | |
| 82 | 34.53 | 0.14 | C:[D]ATABASE–BS54K.L | | | |
| | | | 1,3,5-Triazine, 2-chloro-4,6-bis(m | 20800 | 004407-40-3 | 4 |
| | | | N-Cyano-N',N',N", N"-tetramethyl- | 20808 | 074150-89-2 | 2 |
| | | | Quinoline, 2-chloro-6-methoxy-4-me | 20846 | 006340-55-2 | 2 |
| 83 | 34.69 | 0.36 | C:[D]ATABASE–BS54K.L | | | |
| | | | N-Chlorosuccinimide | 5156 | 000128-09-6 | 4 |
| | | | Vanadium, (.eta.7-cycloheptatrieny | 20876 | 012636-68-9 | 2 |
| | | | 4-Hydroxyphenyl pyrrolidinyl thion | 20855 | 084783-02-8 | 2 |
| 84 | 34.78 | 0.12 | C:[D]ATABASE–BS54K.L | | | |
| | | | Vanadium, (.eta.7-cycloheptatrieny | 20876 | 012636-68-9 | 2 |
| | | | 2-Hydroxyphenyl pyrrolidinyl thion | 20854 | 084783-01-7 | 2 |
| | | | 4-Hydroxyphenyl pyrrolidinyl thion | 20855 | 084783-02-8 | 2 |
| 85 | 35.10 | 0.22 | C:[D]ATABASE–BS54K.L | | | |
| | | | Pyrido[2,3-d]pyrimidine, 4-phenyl- | 20906 | 028732-75-4 | 5 |
| | | | Acetamide, N-[2-(4-nitrophenyl)eth | 21038 | 006270-07-1 | 3 |
| | | | 1H-Indole, 5-methyl-2-phenyl- | 20927 | 013228-36-9 | 2 |
| 86 | 35.19 | 0.31 | C:[D]ATABASE–BS54K.L | | | |
| | | | Phenol, 2,4-dichloro-6-nitro- | 20802 | 000609-89-2 | 5 |
| | | | Anthranilic acid, N-methyl-, butyl | 20901 | 015236-34-7 | 5 |
| | | | 1,3,5-Triazine, 2-chloro-4,6-bis(m | 20800 | 004407-40-3 | 4 |
| 87 | 35.27 | 0.18 | C:[D]ATABASE–BS54K.L | 20901 | 015236-34-7 | 5 |
| | | | Anthranilic acid, N-methyl- | | | |
| | | | Adenosine, 2-methyl- | 33503 | 016526-56-0 | 5 |
| | | | 1,3,5-Triazine, 2-chloro-4,6-bis(m | 20800 | 004407-40-3 | 4 |
| 88 | 35.44 | 0.31 | C:[D]ATABASE–BS54K.L | | | |
| | | | pyrido[2,3-d]pyrimidine, 4-phenyl- | 20906 | 028732-75-4 | 5 |
| | | | Anthranilic acid, N-methyl-, butyl | 20901 | 015236-34-7 | 5 |
| | | | 3,5-Ethanoquinolin-10-one, decahyd | 20908 | 021041-42-9 | 5 |
| 89 | 35.56 | 0.44 | C:[D]ATABASE–BS54K.L | | | |
| | | | Anthranilic acid, N-methyl-, butyl | 20901 | 015236-34-7 | 5 |
| | | | 1,3,5-Triazine, 2-chloro-4,6-bis(m | 20800 | 004407-40-3 | 4 |
| | | | Adenosine, 2-methyl- | 33583 | 016526-56-0 | 3 |
| 90 | 35.63 | 0.17 | C:[D]ATABASE–BS54K.L | | | |
| | | | Gibberellic acid | 41594 | 000077-06-5 | 9 |
| | | | Pyrido[2,3-d]pyrimidine, 4-phenyl- | 20906 | 028732-75-4 | 5 |
| | | | Anthranilic acid, N-methyl-, butyl | 20901 | 015236-34-7 | 5 |
| 91 | 36.11 | 0.14 | C:[D]ATABASE–BS54K.L | | | |
| | | | Pyrido[2,3-d]pyrimidine, 4-phenyl- | 20906 | 028732-75-4 | 5 |
| | | | 1,3,5-Triazine, 2-chloro,-4,6-bis(m | 20800 | 004407-40-3 | 4 |
| | | | Gibberellic acid | 41594 | 000077-06-5 | 4 |
| 92 | 36.13 | 0.27 | C:[D]ATABASE–BS54K.L | | | |
| | | | Anthranilic acid, N-methyl-, butyl | 20901 | 015236-34-7 | 5 |
| | | | Pyrido[2,3-d]pyrimidine, 4-phenyl- | 20906 | 028732-75-4 | 5 |
| | | | 4-Cyclohexene-1,1,2-dicarboximide, N | 20887 | 028916-00-9 | 5 |
| 93 | 36.43 | 0.20 | C:[D]ATABASE–BS54K.L | | | |
| | | | 1,1,1,3,5,7,7,7-OTAMETHYLTETRASIL | 33676 | 000000-00-0 | 33 |
| | | | 2-METHYL-7-PHENYLINDOLE | 20925 | 000000-00-0 | 9 |
| | | | Pyrido[2,3-d]Pyrimidine, 4-phenyl- | 20906 | 021732-75-4 | 5 |
| 94 | 36.72 | 0.55 | C:[D]ATABASE–BS54K.L | | | |
| | | | 1,1,1,3,5,7,7,-OCTAMETHYLTETRASIL | 33676 | 000000-00-0 | 43 |
| | | | 1,1,3,5,5,5-Heptauethyltrisiloxa | 23675 | 001873-88-7 | 40 |
| | | | METHYL (5-HYDROXY-1H-BENZIMIDAZOL | 20818 | 000000.00-0 | 9 |
| 95 | 36.75 | 0.27 | C:[D]ATABASE–BS54K.L | | | |
| | | | 1,1,1,3,5,5,5-Heptamethyltrisiloxa | 23675 | 001873-88-7 | 38 |
| | | | Pyrido[2,3-d]pyrimidine, 4-phenyl- | 20906 | 028732-75-4 | 5 |
| | | | 1H-Isoindole-1,3(2H)-dione, 2-buty | 20889 | 054934-85-9 | 4 |
| 96 | 37.01 | 0.29 | C:[D]ATABASE–BS54K.L | | | |
| | | | 1,1,1,3,5,7,7,7-OTAMETHYLTETRASIL | 33676 | 000000-00-0 | 39 |
| | | | METHYL (5-HYDROXY-1H-BENZIMIDAZOL | 20818 | 000000-00-0 | 9 |
| | | | Anthranilic acid, N-methyl-, butyl | 20901 | 015236-34-7 | 9 |

TABLE 2-continued

| Peak | RT | Area % | Library/ID | Ref # | Cas # | Goal |
|---|---|---|---|---|---|---|
| 97 | 37.42 | 0.34 | C:[D]ATABASE–BS54K.L | | | |
| | | | 1,1,1,3,5,7,7,7-OCTAMETHYLTETRASIL | 33676 | 000000-00-0 | 72 |
| | | | Gibberellic acid | 41594 | 000077-06-5 | 9 |
| | | | Anthranilic acid, N-methyl-, butyl | 20901 | 015236-34-7 | 5 |
| 98 | 37.94 | 3.03 | C:[D]ATABASE–BS54K.L | | | |
| | | | 1,1,1,3,5,7,7,7-OCTAMETHYLTETRASIL | 33676 | 000000-00-0 | 36 |
| | | | 1,2-Bis(trimethylsilyl)benzene | 23815 | 017151-09-6 | 28 |
| | | | 2-METHYL-7-PHENYLINDOLE | 20925 | 000000-00-0 | 9 |
| 99 | 41.64 | 13.26 | C:[D]ATABASE–BS54K.L | | | |
| | | | 1,1,1,3,5,7,7,7-OCTAMETHYLTETRASIL | 33676 | 000000-00-0 | 59 |
| | | | 1,2-Bis(trimethylsilyl)benzene | 23815 | 017151-09-6 | 32 |
| | | | Gibberellic acid | 41594 | 000077-06-5 | 28 |
| 100 | 42.50 | 6.73 | C:[D]ATABASE–BS54K.L | | | |
| | | | 1,1,1,3,5,5,5-Heptamethyltrisiloxa | 23675 | 001873-88-7 | 53 |
| | | | 1,1,1,3,5,7,7,7-OCTAMETHYLTETRASIL | 33676 | 000000-00-0 | 53 |
| | | | Acetic acid, [4-(1,1-dimethylethyl | 23830 | 088530-52-3 | 38 |

Comparing Table 1 to Table 2 it can be seen that:
(a). 100 percent of the methyl ester of formic acid formed as a result of esterification process has been absorbed/adsorbed by the mud clay particles.
(b). 100 percent of the cholorodimethyl borane as a result of the reaction with borates and boric acid has been absorbed/adsorbed by the mud clay particles.
(c). 100 percent of the dioctadecyl ester phosphonic acid has been absorbed/adsorbed by the mud clay particles.
(d). a good majority of the percentage of 2-methyl adenosine has been absorbed/adsorbed by the mud clay particle. This is a base that can react with phosphoric acids (mono, di, or tri), borates and boric acid to eliminate water through a condensation reaction. For example one may obtain adenosine monophosphate (AMP), ADP, and ATP.
(e). presence of the silanes and silicates, like silanamines and 1,1,1,3,5,5,5,- heptamethyltrisiloxane found in Module 5, as a result of the original reaction and as shown in Tables 1 and 2, imparts highly desirable defoaming and nonstickabilty characteristics to the clay suspension (mud) and the formation material.

Tables 1 and 2 further show a host of other radicals of tannins and lignins found in the kier liquor and the raw vegetable oil (cotton seed oil) used in Module 5 in this example. All of these chemicals aid in diflocculation and deagglomeration of the clay suspensions (mud) as well as rock material (shales, clay stone, mud stone, clay-cement, etc.)

FIG. 2A shows an Atomic Force Microscope Micrograph of a clay particle in the drilling mud treated with Module 5 of this example. The thickness of the coating in these Micrograph is approximately 16 Å.

FIG. 2B shows a Phaser Enhanced Atomic Force Microscope Micrograph of a clay particle in the drilling mud treated with Module 5 of this example. The thickness of the coating in this Micrograph is approximately 16 Å which is equal approximately to 5 oxygen molecule layers.

The present invention has been described hereinabove with some degree of particularity in order to illustrate various aspects of the invention. However, it should be appreciated that the scope of the claimed invention is defined by the appended claims, and obvious equivalents thereof.

What is claimed is:

1. A drilling fluid system comprising at least one of the following modules:

an alkaline first module that contains (a) a source of caustic, (b) a natural wax, (c) a natural thinner, (d) glycerol, and (e) phosphoric acid and/or boric acid, a second module prepared by reacting (f) aluminum metal with the components of said alkaline first module thereby forming a soluble alkali metal aluminate;

a third module containing said components of said first module in combination (g) with at least one of an alkali metal phosphate and sodium silicate;

a fourth module containing said components of said first module in combination with (h) a saturated or unsaturated carboxylic acid source, or a fifth module containing said components of said first module in combination with (h) a saturated or unsaturated carboxylic acid source, and (g) at least one of an alkali metal phosphate and sodium silicate, wherein said third, fourth and fifth modules can be used for simultaneously thinning and increasing the lubricity of a drilling mud thus improving penetration of a drill bit, and said second module can be used for thickening a drilling mud.

2. The drilling fluid system of claim 1, wherein said first module comprises scour kier liquor.

3. A drilling fluid comprising (a) a caustic, (b) a natural wax, (c) a natural thinner, (d) glycerol, and (e) phosphoric acid and/or boric acid.

4. The drilling fluid of claim 3, further comprising (i) a gel.

5. The drilling fluid of claim 3, further comprising polysodium acrylamide.

6. The drilling fluid of claim 3, further comprising (f) an aluminum metal which reacts with the composition of claim 3 to form a soluble alkali metal aluminate.

7. The drilling fluid of claim 6, further comprising (i) a gel.

8. The drilling fluid of claim 6, further comprising polysodium acrylamide.

9. The drilling fluid of claim 3, further comprising (g) at least one of an alkali metal phosphate and sodium silicate.

10. The drilling fluid of claim 9, further comprising (i) a gel.

11. The drilling fluid of claim 9, further comprising polysodium acrylamide.

12. The drilling fluid of claim 9, wherein the alkali metal phosphate is selected from the group consisting of mono-, and tri-sodium phosphate, mono-, di-, and tri-potassium phosphate, and mono-, di-, and tri-cesium phosphate.

13. The drilling fluid of claim 9, further comprising borax.

14. The drilling fluid of claim 3, further comprising (h) a $C_{1-24}$ saturated or $C_{2-24}$ unsaturated carboxylic acid source.

15. The drilling fluid of claim 14, further comprising (i) a gel.

16. The drilling fluid of claim 14, further comprising polysodium acrylamide.

17. The drilling fluid of claim 14, further comprising a surfactant and/or a preservative.

18. The drilling fluid of claim 3, further comprising (h) a saturated or unsaturated carboxylic acid source, and (g) at least one of an alkali metal phosphate and sodium silicate.

19. The drilling fluid of claim 18, further comprising (i) a gel.

20. The drilling fluid of claim 18, further comprising polysodium acrylamide.

21. The drilling fluid of claim 18, further comprising a surfactant and/or a preservative.

22. A drilling mud comprising at least one drilling fluid module according to claim 1.

23. The drilling mud of claim 22, further comprising polysodium acrylamide.

24. A drilling mud of claim 22, wherein the drilling mud comprises 0.001 to 2.0 volume percent of the drilling fluid module.

25. A drilling mud comprising the drilling fluid of claim 3.

26. A drilling mud of claim 25, wherein the drilling mud comprises 0.001 to 2.0 volume percent of the drilling fluid.

27. A drilling mud comprising the drilling fluid of claim 6.

28. A drilling mud of claim 27, wherein the drilling mud comprises 0.001 to 2.0 volume percent of the drilling fluid.

29. A drilling mud comprising the drilling fluid of claim 9.

30. A drilling mud of claim 29, wherein the drilling mud comprises 0.001 to 2.0 volume percent of the drilling fluid.

31. A drilling mud comprising the drilling fluid of claim 14.

32. A drilling mud of claim 31, wherein the drilling mud comprises 0.001 to 2.0 volume percent of the drilling fluid.

33. A drilling mud comprising the drilling fluid of claim 18.

34. A drilling mud of claim 33, wherein the drilling mud comprises 0.001 to 2.0 volume percent of the drilling fluid.

35. The drilling method comprising injecting at least one drilling fluid module according to claim 1 into a borehole and drilling into the earth.

* * * * *